(12) United States Patent
Allgaeuer et al.

(10) Patent No.: US 11,318,813 B2
(45) Date of Patent: May 3, 2022

(54) THERMAL SYSTEM FOR AN ELECTRIC OR HYBRID VEHICLE, ELECTRIC OR HYBRID VEHICLE, METHOD FOR OPERATING A THERMAL SYSTEM

(71) Applicant: Bayerische Motoren Werke Aktiengesellschaft, Munich (DE)

(72) Inventors: Christian Allgaeuer, Munich (DE); Oliver Horn, Munich (DE); Markus Moser, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 148 days.

(21) Appl. No.: 16/824,149

(22) Filed: Mar. 19, 2020

(65) Prior Publication Data

US 2020/0298663 A1     Sep. 24, 2020

(30) Foreign Application Priority Data

Mar. 20, 2019   (DE) ..................... 10 2019 107 191.7

(51) Int. Cl.
*B60H 1/00*     (2006.01)
(52) U.S. Cl.
CPC ....... *B60H 1/00885* (2013.01); *B60H 1/0065* (2013.01); *B60H 1/00278* (2013.01)
(58) Field of Classification Search
CPC ............ B60H 1/00885; B60H 1/00278; B60H 1/00499; B60H 1/143
See application file for complete search history.

(56) References Cited

U.S. PATENT DOCUMENTS

| 2016/0107503 A1* | 4/2016 | Johnston | B60H 1/32284 165/202 |
| 2016/0107505 A1* | 4/2016 | Johnston | B60H 1/00914 165/202 |

(Continued)

FOREIGN PATENT DOCUMENTS

| DE | 10 2011 016 070 A1 | 10/2012 |
| DE | 10 2015 220 623 A1 | 4/2017 |
| DE | 10 2017 220 376 A1 | 5/2019 |

OTHER PUBLICATIONS

German-language Search Report issued in German Application No. 10 2019 107 191.7 dated Nov. 28, 2019 with partial English translation (12 pages).

*Primary Examiner* — Nelson J Nieves
(74) *Attorney, Agent, or Firm* — Crowell & Moring LLP

(57) ABSTRACT

A thermal system for a vehicle having a comprehensive cooling circuit, a refrigeration circuit, a cooling circuit, a heating circuit, and a plurality of switched states is disclosed. The cooling circuit is connected with a heat source of the vehicle. The cooling circuit has a high-voltage accumulator (HVA) circuit to which a high-voltage accumulator for supplying power to an electric drivetrain of the vehicle is connected. An ambient cooler is connected to the cooling circuit downstream of the heat source. A chiller for transferring heat from the HVA circuit into the refrigeration circuit is also connected to the refrigeration circuit. A first switched state, in which the HVA circuit downstream and upstream of the heat source is connected to the cooling circuit, can be set such that an extended HVA circuit, in which the high-voltage accumulator and the heat source are connected in series is configured.

20 Claims, 4 Drawing Sheets

(56) References Cited

U.S. PATENT DOCUMENTS

| | | | |
|---|---|---|---|
| 2018/0236842 A1 | 8/2018 | Allgaeuer et al. | |
| 2019/0135071 A1* | 5/2019 | Hwang | B60H 1/143 |
| 2019/0135075 A1* | 5/2019 | Hwang | B60H 1/00 |
| 2019/0145675 A1* | 5/2019 | Kim | B60H 1/00278 |
| | | | 62/324.6 |
| 2019/0176572 A1* | 6/2019 | Kim | B60H 1/00428 |
| 2019/0291540 A1* | 9/2019 | Gutowski | B60H 1/00385 |
| 2019/0381857 A1* | 12/2019 | Lee | B60H 1/00328 |
| 2020/0031194 A1* | 1/2020 | Lee | B60H 1/00392 |
| 2020/0031250 A1* | 1/2020 | Yuan | H01M 10/625 |
| 2020/0122545 A1* | 4/2020 | Lee | B60H 1/00885 |
| 2020/0189357 A1* | 6/2020 | Chopard | B60H 1/00492 |
| 2020/0231024 A1* | 7/2020 | Shrivastava | B60H 1/00985 |
| 2020/0276879 A1* | 9/2020 | Kim | B60H 1/143 |
| 2020/0290429 A1* | 9/2020 | Blatchley | B60H 1/00278 |
| 2020/0346520 A1* | 11/2020 | Ishizeki | B60H 1/32284 |
| 2021/0031588 A1* | 2/2021 | Yahia | B60H 1/00278 |
| 2021/0190393 A1* | 6/2021 | Lee | F02M 21/0212 |

* cited by examiner

THERMAL SYSTEM FOR AN ELECTRIC OR HYBRID VEHICLE, ELECTRIC OR HYBRID VEHICLE, METHOD FOR OPERATING A THERMAL SYSTEM

CROSS REFERENCE TO RELATED APPLICATION

This application claims priority under 35 U.S.C. § 119 from German Patent Application No. 10 2019 107 191.7, filed Mar. 20, 2019, the entire disclosure of which is herein expressly incorporated by reference.

BACKGROUND AND SUMMARY OF THE INVENTION

The present subject matter relates to a thermal system for an electric or hybrid vehicle, as well as to any other corresponding vehicle having such a thermal system. The present subject matter further relates to a method for operating the thermal system.

An electric or hybrid vehicle has an electric drivetrain for propulsion which is supplied with electric energy from a high-voltage accumulator (HVA). The high-voltage accumulator is likewise a component part of the vehicle and alternatively is also referred to as an electric accumulator or as a battery. The high-voltage accumulator is correspondingly dimensioned in order for the drivetrain to be adequately supplied. The temperature-controlling of the high-voltage accumulator is important in terms of an optimum operation of the vehicle. The high-voltage accumulator for temperature-controlling is incorporated in a thermal system of the vehicle, for example. The thermal system typically carries out various temperature-controlling tasks in the vehicle, such as supplying or discharging heat to and from various vehicle components, the latter being connected to the thermal system.

A thermal system in which a high-voltage accumulator is disposed conjointly with a chiller in an HVA circuit is described in DE 10 2015 220 623 A1. The HVA circuit in a first HVA cooling operation is separated from a cooling circuit such that heat from the high-voltage accumulator is discharged into a refrigeration circuit by way of the chiller. By contrast, the HVA circuit in a second HVA cooling operation is connected to the cooling circuit such that heat from the high-voltage accumulator is discharged to the environment by way of a cooler in the cooling circuit, while bypassing the chiller. Heating of the high-voltage accumulator in an HVA heating operation is implemented in that the HVA circuit is able to be connected to a heating circuit in which a booster heater is disposed. The booster heater actually serves for supplying heat on demand into the heating circuit for the purpose of heating the cabin, but on account of a direct connection of the heating circuit to the HVA circuit can also be used for heating the high-voltage accumulator. A cross connection which connects the heating circuit downstream of the booster heater to the HVA circuit upstream of the high-voltage accumulator is configured.

A cooling system, likewise having an HVA circuit, having a high-voltage accumulator and a chiller, as well as furthermore having a cooling circuit, having a cooler is described in the unpublished German patent application 10 2017 220 376. The HVA circuit in a first operation is fluidically separated from the cooling circuit, and discharging of heat from the high-voltage accumulator into a refrigeration circuit takes place by way of the chiller. By contrast, the HVA circuit and the cooling circuit in a second operation are connected in such a manner that the high-voltage accumulator, the chiller, and the cooler are connected in series, and heat from the high-voltage accumulator is able to be discharged by way of said two components. By contrast to the second operation, a heat source, the chiller, and the cooler in a third operation are connected in series such that heat from the heat source is able to be discharged by way of the chiller and the cooler, while there is no flow through the high-voltage accumulator and no exchange of heat thus takes place with the latter.

Against this background, it is an object of the present subject matter to specify an improved thermal system. Furthermore to be specified is an electric or hybrid vehicle having such a thermal system as well as a method for operating the thermal system. Temperature-controlling of a high-voltage accumulator of the electric or hybrid vehicle that is as efficient as possible is to be achieved by means of the thermal system. The thermal system is to enable the largest possible number in terms of operating modes by way of an ideally minor constructive complexity.

The object is achieved according to the present subject matter by a thermal system having the features according to claim 1. The object is furthermore achieved by an electric or hybrid vehicle having the features according to claim 16, as well as by a method having the features according to claim 17. Advantageous design embodiments, refinements, and variants are the subject matter of the dependent claims. The explanations in the context of the thermal system apply in an analogous manner also to the electric or hybrid vehicle as well as to the method, and vice versa.

The thermal system is configured for use in an electric or hybrid vehicle. The electric or hybrid vehicle will also be referred to for short as vehicle. The thermal system has a comprehensive cooling circuit as well as a refrigeration circuit. The thermal system furthermore has a plurality of switched states. The comprehensive cooling circuit has a cooling circuit to which a heat source of the electric or hybrid vehicle is connected. The comprehensive cooling circuit furthermore has an HVA circuit to which a high-voltage accumulator for supplying an electric drivetrain of the electric or hybrid vehicle is connected. A first ambient cooler for exchanging heat with the environment is connected to the cooling circuit downstream of the heat source. A chiller which for transmitting heat from the HVA circuit into the refrigeration circuit is also connected to the refrigeration circuit is connected to the HVA circuit. A first switched state in which the HVA circuit downstream and upstream of the heat source is connected to the cooling circuit is able to be set such that an extended HVA circuit in which the high-voltage accumulator and the heat source for heating the high-voltage accumulator by means of the heat source and at the same time also for cooling the heat source are connected in series is configured.

Since the thermal system has a plurality of switched states, at least one further switched state is able to be set in which the high-voltage accumulator and the heat source are not connected in series, in that the HVA circuit and the cooling circuit are mutually separated, or in that the HVA circuit and the cooling circuit are connected to one another in such a manner that the high-voltage accumulator is switched in parallel with the heat source.

The first switched state is characterized by switching in series the high-voltage accumulator, the heat source, and also the chiller. A substantial advantage of this first switched state is that the high-voltage accumulator is able to be heated using heat which in the operation of the heat source is automatically generated by the latter. Instead of discharging this exhaust heat to the environment, for example, the exhaust heat is utilized for heating the high-voltage accumulator. On account thereof, electric energy which otherwise would have to be used, for example, for operating an electric heating element for heating the high-voltage accumulator and would no longer be available for propulsion, is saved. A separate booster heating, for example by means of an electric heating element, is initially not required and is advantageously dispensed with. The special circuitry of the thermal system in conjunction with the possibility of setting at least one further switched state, furthermore enables various operating modes for the thermal system and thus a flexible thermal management.

The afore-mentioned connection in series consisting of the high-voltage accumulator, heat source, and the chiller moreover represents a substantial difference in comparison to the unpublished German patent application 10 2017 220 376 mentioned at the outset, in which the connection of the HVA circuit and of the cooling circuit is implemented only downstream of the heat source but not additionally upstream of the heat source such that utilizing the exhaust heat of the heat source for heating the high-voltage accumulator is not possible. A connection in series of the high-voltage accumulator and the heat source is also not possible in DE 10 2015 220 623 A1 cited likewise at the outset; rather, only a connection in parallel is implemented therein.

The comprehensive cooling circuit is configured for circulating a coolant and has corresponding lines as well as at least one pump. The coolant is a water/glycol mixture. The cooling circuit and the HVA circuit form in each case a sub-unit of the comprehensive cooling circuit, and all of the component parts of the cooling circuit and of the HVA circuit are also component parts of the comprehensive cooling circuit. The comprehensive cooling circuit, the cooling circuit, and the HVA circuit are in each case also referred to as "circuit" for short.

The refrigeration circuit is configured for circulating a refrigerant. The comprehensive cooling circuit and the refrigeration circuit are fluidically mutually separated. The refrigeration circuit has a compressor for compressing the refrigerant, one or a plurality of evaporators for absorbing heat in the refrigeration circuit, as well as one or a plurality of condensers for dispensing heat from the refrigeration circuit. An expansion valve for relaxing the refrigerant is disposed upstream of at least one evaporator, usually all evaporators. The chiller, which is connected to the comprehensive cooling circuit as well as to the refrigeration circuit, in the refrigeration circuit is an evaporator, thus receives heat from the coolant and transfers said heat to the refrigerant. The amount of heat which is transmitted from the chiller into the refrigeration circuit is achieved by correspondingly controlling an expansion valve which in the refrigeration circuit is disposed upstream of the chiller, and also by correspondingly controlling the compressor. The chiller is able to be deactivated by completely closing the expansion valve and then no longer transmits any heat. The chiller is able to be activated by opening the expansion valve. The expansion valve ahead of the chiller is regulated as a function of the suction pressure and also of the temperature of the refrigerant upstream of the compressor. The suction pressure is measured by means of a corresponding pressure and temperature sensor. Monitoring of the compressor takes place as a function of the pressure and temperature of the refrigerant downstream of the compressor, that is to say as a function of the high pressure and the hot gas temperature. The high pressure and the hot gas temperature are measured by means of a pressure and temperature sensor downstream of the compressor. Regulating of the compressor takes place as a function of a cooling demand for the cabin or for the high-voltage accumulator, wherein a corresponding temperature is used as the control variable.

The chiller in one variant is configured in multiple parts, thus has at least two chiller units which in the HVA circuit are connected in parallel or in series and overall act as a single chiller. The subdivision into a plurality of chiller units however has the advantage that each chiller unit can be connected to a separate refrigeration circuit and in an embodiment is also connected thereto. The refrigeration circuits can advantageously be dimensioned so as to be smaller on account thereof, in terms of the output of the respective compressor. Heat is initially discharged only by means of a single chiller unit. A further refrigeration circuit by way of the associated chiller unit is then activated in the event of a corresponding demand and is switched in tandem, so to speak. Moreover, in the case of a plurality of refrigeration circuits, the discharging of heat from said plurality of refrigeration circuits can be implemented in a variable manner so as to meet demand.

Further suitable variants of the refrigeration circuit are derived in combination with one or a plurality of internal heat exchangers. A respective internal heat exchanger serves for thermally coupling a no-pressure line of the refrigeration circuit to a high-pressure line of the refrigeration circuit and leads to an increase in terms of efficiency and output. In the case of a plurality of evaporators that are connected in parallel in the refrigeration circuit, and an embodiment in which one internal heat exchanger is correspondingly present for each one of the evaporators is suitable.

Heat which is transmitted into the refrigeration circuit is expediently discharged by means of the condenser. The condenser discharges heat, for example to the environment or to a separate condenser cooling circuit. However, an embodiment in which the condenser is connected to the comprehensive cooling circuit so as to feed the heat which is discharged from the chiller back to the comprehensive cooling circuit at another location and therein advantageously utilize said heat for heating, or discharge said heat to the environment, is expedient. For the purpose of the latter it is especially expedient for the condenser to be connected in series with the first ambient heat exchanger.

The thermal system overall serves for meeting various temperature-controlling requirements of components of the vehicle. "Temperature-controlling" is understood to be cooling or heating. Components of the vehicle are also referred to as "vehicle components". The thermal system serves for exchanging heat with the vehicle components which are connected to the comprehensive cooling circuit or the refrigeration circuit. Herein, the wording that a respective vehicle component is "connected" to the comprehensive cooling circuit or the refrigeration circuit, or is "disposed" therein is used hereunder for simplification, this meaning that the vehicle component is connected to a suitable heat exchanger or is equipped with the latter, and said heat exchanger in this instance is connected to the comprehensive cooling circuit or the refrigeration circuit, respectively, and for temperature-controlling the vehicle component in question is passed through by a flow of the coolant or refrigerant, respectively, such that an exchange of heat with the vehicle component takes place.

The thermal system furthermore has a plurality of switched states which are mutually exclusive. One or a plurality of operating modes can be implemented in each switched state. A respective operating mode is set so as to temperature-control a specific component. In order for a plurality of components to be simultaneously temperature-controlled, the respective operating modes are set simultaneously. Which operating modes are able to be set at a given point in time, that is to say which temperature requirements are able to be met at a given point in time, depends on the current switched state of the thermal system. The setting of a switched state and optionally of one or a plurality of operating modes takes place by means of a control unit which in the operation of the thermal system sets a respective switched state or operating state. The control unit is configured for switching between different switched states and for setting one or a plurality of operating modes, that is to say switch on or switch off the latter. The control unit is connected to and controls corresponding actuators, pumps, components, or other component parts of the thermal system. The term "control" as a special case also comprises "regulate" (closed-loop control). The control unit is part of the thermal system. Alternatively or additionally, the thermal system is controlled by an external control unit.

The heat source is a vehicle component. In general, the heat source in operation generates exhaust heat which is discharged by way of the thermal system. In an embodiment, the heat source is a power electronics unit, an electric machine, an internal combustion engine, a rear vent, or the like. The power electronics unit controls the supply of the electric machine with electric energy from the high-voltage accumulator of the vehicle. The electric machine serves for driving the vehicle. In one variant, the electric machine is also utilized as a generator, for example for recuperating and for charging the high-voltage accumulator. To the extent present, the internal combustion engine serves for driving the vehicle in a non-electric manner or as a range extender. The electric machine and the power electronics unit are parts of an electric drivetrain of the vehicle. The heat source is not necessarily a single vehicle component but is alternatively a combination of a plurality of vehicle components which in the cooling circuit are connected in parallel or in series, or a combination thereof.

The first ambient cooler serves for exchanging heat with the environment and is an air/coolant heat exchanger. The first ambient cooler is disposed in an ambient air path and in operation is typically impinged with ambient air, in the driving operation of the vehicle especially by the air stream. A fan for suctioning ambient air is disposed in the ambient air path, downstream of the first ambient cooler. A number of air flaps for controlling the supply of ambient air into the ambient air path are suitably disposed in the ambient air path upstream of the first ambient cooler. The fan and the air flaps are controlled by the control unit so as to set the extent of the heat exchange with the environment.

The high-voltage accumulator serves for supplying power to the electric drive of the vehicle with electric energy and is correspondingly configured to this end. The high-voltage accumulator usually has a multiplicity of cells which are electrically interconnected. Additionally, it is also possible for electric energy from the high-voltage accumulator to be retrieved for supplying power to other vehicle components. The high-voltage accumulator is alternatively also referred to as an electric accumulator or as a battery.

The first ambient cooler and the heat source are connected in series in any switched state of the thermal system. Likewise, the high-voltage accumulator and the chiller are connected in series in any switched state of the thermal system.

A cooling circuit pump for conveying or recirculating the coolant in the cooling circuit is expediently disposed in the cooling circuit. The cooling circuit pump is disposed downstream of the first ambient cooler and upstream of the heat source. Positioning of the cooling circuit pump at that location of the cooling circuit where the coolant has the lowest temperature is advantageous. On account thereof, cavitations are avoided and an improved efficiency and longer service life of the cooling circuit pump are guaranteed. However, another positioning can likewise be advantageous, for example for reasons of installation space or geometry.

Accordingly, an HVA pump for conveying or recirculating the coolant in the HVA circuit is expediently disposed in the HVA circuit. The HVA pump is disposed downstream of the chiller and upstream of the high-voltage accumulator. The HVA pump and the cooling circuit pump are in each case generally also referred to as "pump". The two pumps are able to be controlled in a mutually independent manner. Various operating modes can be set in combination with the various switched states by suitably activating and deactivating the two pumps.

As has already been described, the high-voltage accumulator and the heat source in the first switched state are connected in series. On account thereof, a first HVA heating operation in which the high-voltage accumulator is heated by means of the heat source is enabled as an operating mode. To this end, the HVA pump in the first HVA heating operation is activated, but the cooling circuit pump is deactivated such that coolant is recirculated only in the extended HVA circuit. The first HVA heating operation is simultaneously also a cooling operation for the heat source. Heating the high-voltage accumulator is meaningful at low ambient temperatures, for example in winter, and generally when the high-voltage accumulator is to be brought to a specific operating temperature. In the event of a corresponding demand, the first HVA heating operation in this instance is set and the HVA pump is activated to this end. The chiller and the cooling circuit pump however are deactivated. In one variant, the chiller or the cooling circuit pump, or both, however are activated so as to discharge excess heat from the HVA circuit, for example should the heat source generate more heat than is required for heating the high-voltage accumulator, or should heat be required for heating the cabin.

In order for the connection in series to be implemented, the HVA circuit upstream of the heat source in an embodiment is connected to the cooling circuit by means of a first connecting line, and downstream of the heat source by means of a second connecting line. The first connecting line herein is connected to the HVA circuit at a first connector point, and to the cooling circuit at a second connector point. The second connecting line is connected to the HVA circuit at a third connector point, and to the cooling circuit at a fourth connector point. The first connector point and the third connector point in the HVA circuit are both disposed downstream of the high-voltage accumulator and upstream of the chiller, wherein the third connector point is disposed downstream of the first connector point. The second connector point in the cooling circuit is disposed upstream of the heat source and expediently downstream of the first ambient cooler. The fourth connector point in the cooling circuit is disposed downstream of the heat source and expediently upstream of the ambient cooler.

The coolant in the first HVA heating operation flows from the high-voltage accumulator to the first connector point, and by way of the first connecting line to the heat source, from there by way of the second connecting line to the third connector point and to the chiller, and finally back to the high-voltage accumulator. An extended HVA circuit, so to speak, is configured in the first HVA heating operation on account of the heat source thus being incorporated by means of the two connecting lines. The extended HVA circuit differs from the HVA circuit in that the HVA circuit has a line portion which extends between the first and the third connector point, and in that the extended HVA circuit instead of said line portion comprises the two connecting lines and an intervening line portion of the cooling circuit.

The connection in series of the high-voltage accumulator and the heat source in the present thermal system is however expediently not fixed but in other switched states is cancelled in favor of other operating modes. Accordingly, there is at least one switched state in which the high-voltage accumulator and the cooling circuit are not connected in series. Instead, the HVA circuit and the cooling circuit in a first variant are mutually separated such that no exchange of coolant between the two circuits takes place in the corresponding switched state, and said two circuits are able to be operated in an autonomous manner, so to speak. In a second variant, the HVA circuit and the cooling circuit are connected to one another in such a manner that the high-voltage accumulator is connected in parallel with the heat source, the HVA circuit and the cooling circuit thus being connected to different sub-branches of the comprehensive cooling circuit.

A connection of two components "in series" is generally understood as the one component in terms of the flow direction of the coolant being disposed upstream or downstream of the other component, thus that the coolant successively flows through both components. By contrast, a connection of two components "in parallel" is generally understood as two junctions being configured in one circuit, wherein the coolant at the one junction is divided among two sub-branches and is converged again at the other junction such that the two components which are disposed on different sub-branches are passed through by the flow of the coolant in parallel. The same applies in an analogous manner for circuits, branches, and the like that are connected in series or in parallel.

The various circuits of the comprehensive cooling circuit are in principle fluidically, i.e. hydraulically, connected to one another by way of a number of lines such that an exchange of coolant between the different circuits takes place depending on the operating mode. "Separate" in this instance is understood that the respective circuit in the corresponding switched state is only shut off, by means of a suitable actuator, such that no exchange of coolant between the separated circuit and the other circuit takes place. Nevertheless, in principle a connection does exist by way of corresponding lines. "Connected" in this instance is usually understood that an exchange of coolant between two corresponding circuits is possible in the corresponding switched state and also takes place in operation. Connecting and separating takes place by means of suitable actuators which shut off two circuits in relation to one another or connect said two circuits for the purpose of an exchange of coolant. The terms "coupled" and "decoupled", respectively, are also used instead of the terms "connected" and "separated".

In an embodiment, the first switched state is able to be set by means of a first actuator which in the HVA circuit is disposed downstream of the high-voltage accumulator and which has two switched positions, specifically a first switched position in which the HVA circuit for setting the first switched state is connected to the cooling circuit upstream of the heat source, by way of the first connecting line, and a second switched position in which the HVA circuit is separated from the cooling circuit or is connected to the latter downstream of the heat source such that another switched state is set. The first actuator is set to the first switched position only in the first switched state, and in all other switched states is set to the second switched position.

The first actuator is a valve. The first actuator is disposed in the HVA circuit and has an inlet which is disposed downstream of the high-voltage accumulator and a first outlet which is connected to the cooling circuit upstream of the heat source, by way of the first connecting line. The actuator furthermore has a second outlet which leads to the second connecting line and is disposed upstream of the chiller. Depending on the switched position, the coolant thus either flows by way of the first outlet initially to the heat source and thereafter to the chiller, or by way of the second outlet specifically not to the heat source but, for example, to the chiller or to the cooling circuit downstream of the heat source. Proceeding from the extended HVA circuit described above, a bypass for bypassing the heat source is configured in the second switched position. The first actuator in an embodiment forms the first connector point. The first actuator in an embodiment is configured as a 3/2-way valve.

The heat source is able to be operated at a reduced efficiency, and thus, in a sub-optimal manner and is accordingly operated using a "trimming" operation. Stated differently, by trimming the heat source, the latter in a targeted manner is ineffectively operated so as to generate more exhaust heat for heating the high-voltage accumulator than in the absence of trimming. In the case of the heat source generating insufficient exhaust heat for heating the high-voltage accumulator, the trimming operation is expediently set in the first switched state. To this end, the heat source is a component of an electric drivetrain of the electric or hybrid vehicle, and the component for heating the high-voltage accumulator in the first switched state by trimming is configured for generating additional heat. The electric machine for driving the vehicle is most suitable for trimming. Trimming is advantageously also possible in a stationary operation of the vehicle; the vehicle thus does not mandatorily have to be in motion to this end.

Conversely, in the case of the heat source generating more exhaust heat than is required for heating the high-voltage accumulator, and should there additionally be a heating demand for the cabin of the vehicle, the chiller is expediently activated and a corresponding excess of heat by means of said chiller is transmitted from the extended HVA circuit into the refrigeration circuit. The heat is otherwise dissipated to the environment, and the refrigeration circuit is deactivated, on account of which energy is correspondingly saved.

In an embodiment, as a further switched state, a second switched state in which the HVA circuit and the cooling circuit for temperature-controlling the heat source and the high-voltage accumulator in a mutually independent manner are mutually separated such that the chiller is separated from the cooling circuit and such that the first ambient cooler is separated from the HVA circuit is able to be set. The second switched state, by virtue of the separation of the HVA circuit and the cooling circuit, offers the possibility of various operating modes to be chosen and set for the high-voltage accumulator and the heat source in a mutually independent manner. Potential and advantageous operating modes are: a first HVA cooling operation, a homogenization operation, a second HVA heating operation, a first heat-source cooling operation.

In the first HVA cooling operation, the chiller is activated and coolant is conveyed in the HVA circuit in that the HVA pump is activated such that the high-voltage accumulator is cooled by means of the chiller. The coolant in the first HVA cooling operation flows from the high-voltage accumulator by way of the first connector point directly to the third connector point, and thereafter to the chiller and back to the high-voltage accumulator, that is to say not by way of the heat source as in the extended HVA circuit.

By contrast, the chiller in the homogenization operation is deactivated, but coolant continues to be conveyed in the HVA circuit, by means of the HVA pump, such that a temperature spread within the high-voltage accumulator is reduced. The homogenization operation therefore differs from the first HVA cooling operation only in that the chiller is deactivated such that no discharge of heat from the HVA circuit takes place but heat is indeed preserved in the latter. On account thereof, an advantageous homogenization of the temperatures of the individual cells of the high-voltage accumulator is achieved in a simple way. The homogenization operation thus serves for homogenizing the temperature within the high-voltage accumulator. The high-voltage accumulator has a multiplicity of cells which are potentially temperature-controlled in a non-homogeneous manner and on account thereof have dissimilar temperatures. On account thereof, when viewed across the entire high-voltage accumulator, a disadvantageous temperature spread results which is advantageously reduced by way of the homogenization operation. An internal redistribution of heat, so to speak, takes place in terms of the high-voltage accumulator in that warmer than average cells dissipate heat to the coolant and are cooled on account thereof, and in that the coolant then in turn dissipates said heat to colder than average cells and on account thereof heats the latter.

In the second HVA heating operation, an HVA booster heater in the HVA circuit is activated, and coolant in the HVA circuit is conveyed by means of the HVA pump such that the high-voltage accumulator is heated. To this end, in an embodiment, an HVA booster heater for supplying additional heat into the HVA circuit is connected downstream of the high-voltage accumulator and upstream of the chiller in the HVA circuit. The HVA booster heater is however advantageously also able to be utilized for other temperature-controlling tasks, for example for heating the cabin.

In the first heat source cooling operation, exhaust heat from the heat source is discharged by way of the cooling circuit and is dissipated to the environment by way of the first ambient heat exchanger, for example. The first heat source cooling operation is advantageously able to be set independently of the first HVA cooling operation, of the homogenization operation, and of the second HVA operation, such that the heat source is thus cooled in an optimal manner independently of the temperature-controlling demand in terms of the high-voltage accumulator. If the first heat source cooling operation as well as the first HVA cooling operation are set, the heat source in this instance is cooled by way of the ambient cooler but not by way of the chiller, and the high-voltage accumulator is conversely cooled by way of the chiller but not by way of the ambient cooler.

In an embodiment, as a further switched state, a third switched state in which the HVA circuit for cooling the heat source by way of the chiller on the first ambient cooler, or both, is connected to the cooling circuit upstream and downstream of the chiller such that the heat source, the chiller, and the first ambient cooler are connected in series in such a manner that the heat source is disposed upstream of the chiller and the first ambient cooler is disposed downstream of the chiller is able to be set. The third switched state by virtue of the connection in series of the heat source, the chiller, and the first ambient cooler, offers the advantageous possibility of cooling the heat source in a effective manner by way of different heatsinks, specifically the chiller and the first ambient cooler. In the heat pump operation, thus in the event of an activated heat pump, absorbing heat from the environment is moreover advantageously enabled should the chiller cool the coolant to below the ambient temperature.

The connection in series of the heat source, the chiller, and the first ambient cooler is suitably implemented in that the HVA circuit and the cooling circuit are connected by means of a third connecting line which in the HVA circuit commences downstream of the chiller and upstream of the high-voltage accumulator at a fifth connector point, and at a sixth connector point downstream of the heat source and upstream of the ambient cooler opens into the cooling circuit. In this way, a line portion of the cooling circuit between the fourth connector point and the sixth connector point is configured as a chiller bypass. The coolant in the third switched state, downstream of the heat source can now either be guided to the ambient cooler by way of the chiller, or in another switched state by way of the chiller bypass be guided past the chiller directly to the ambient cooler. In the third switched state, the chiller and likewise the cooling circuit pump are expediently activated for cooling the heat source.

The third switched state moreover has the advantage that indirect cooling of the high-voltage accumulator by means of the first ambient cooler can be implemented in a simple manner by activating the HVA pump, despite said two components not being connected in series in the third switched state. To this end, in an embodiment, a junction is in each case configured upstream and downstream of the chiller such that two sub-branches, specifically an HVA branch and a cooler branch, are configured, wherein the high-voltage accumulator is connected to the HVA branch, and wherein the heat source and the first ambient cooler are connected to the cooler branch. The HVA branch and the cooler branch in the third switched state, for cooling the high-voltage accumulator by means of the first ambient cooler by mixing coolant from the two sub-branches upstream of the chiller, are then connected in parallel with one another.

The third switched state thus advantageously enables the following two operating modes: a second heat source cooling operation in which the heat source is cooled by means of the chiller and optionally additionally by means of the first ambient cooler, as well as a second HVA cooling operation in which coolant is conveyed in the HVA circuit as well as in the cooling circuit, the coolant is cooled in the cooling circuit, and in the HVA circuit is mixed with the coolant such that the high-voltage accumulator is cooled indirectly by way of the cooling circuit.

In the case of the coolant in the second heat source cooling operation when flowing into the first ambient cooler having a temperature which is lower than the ambient temperature, absorbing heat from the environment by means of the ambient cooler is possible. The absorption of heat at the ambient cooler depends on the travelling speed of the vehicle and optionally on the volumetric throughput of a fan in the ambient air path. The heat absorbed from the environment is then expediently used for heating, for example for heating the cabin. A temperature sensor for measuring the temperature of the coolant when flowing into the first ambient cooler is expediently connected to the cooling circuit upstream of said first ambient cooler.

The second HVA cooling operation is fundamentally designed as the second heat source cooling operation and corresponds to the latter to the extent that the heat source, the chiller, and the ambient cooler are connected in series. Additionally however, the HVA pump is now activated in the second HVA cooling operation. On account thereof, coolant which flows from the high-voltage accumulator to the chiller mixes with the coolant which flows from the heat source to the chiller such that cooling of the high-voltage accumulator is implemented as a result. The mixing takes place at the third connector point at which the coolant from the heat source is guided into the HVA circuit by way of the second connecting line. In terms of the mixing it is essential that the HVA pump is activated such that the coolant is also guided through the high-voltage accumulator. Moreover, the cooling circuit pump is also activated so as to convey the coolant through the first ambient cooler. The cooling of the high-voltage accumulator in this instance is set by the ratio of the pump output of the HVA pump and that of the cooling circuit pump.

In the second HVA cooling operation, exhaust heat from the high-voltage accumulator is thus effectively guided through the chiller to the ambient cooler and at the latter is dissipated to the environment. In comparison to cooling the high-voltage accumulator solely by way of the chiller, as in the first HVA cooling operation, the refrigeration circuit in the second HVA cooling operation is advantageously de-stressed by the first ambient cooler as an additional heatsink, and the chiller can accordingly be operated at a lower output or be entirely deactivated. Energy is accordingly saved on account thereof. A partial or complete discharge of heat into the refrigeration circuit by means of the chiller in comparison to a dissipation of heat to the environment is however more advantageous when there is a heating demand, for example for heating the cabin, which is then expediently catered for by means of the exhaust heat from the high-voltage accumulator.

In an embodiment, a second actuator in the cooling circuit is disposed upstream of the ambient cooler, said second actuator having two switched positions, specifically a first switched position in which the heat source for bypassing the chiller by way of a chiller bypass, as has already been described above, is connected in series with the ambient cooler, and a second switched position in which the HVA circuit downstream of the chiller is connected to the cooling circuit such that the heat source, the chiller, and the ambient cooler are connected in series in such a manner that the chiller for setting the third switched state is disposed upstream of the ambient cooler and downstream of the heat source. By contrast, the first switched position is suitable for setting the second switched state of the thermal system.

The second actuator is a valve. In principle, two positions are suitable for the second actuator in the cooling circuit, specifically either at the beginning or at the end of the chiller bypass, that is to say at the fourth connector point or at the sixth connector point. Depending on the positioning relative to the chiller bypass, the second actuator has one inlet and two outlets, or conversely two inlets and one outlet. The positioning at the end of the chiller bypass, at the sixth connector point, is preferable such that the chiller bypass opens into a first inlet and the HVA circuit, by way of the third connecting line, is connected to a second inlet. An outlet in this instance leads to the ambient cooler. In the first switched position, coolant by way of the chiller bypass is then guided into the first inlet and the first heat source cooling operation is thus enabled. By contrast, the chiller bypass in the second switched position is shut off, and coolant is guided by way of the chiller to the first ambient cooler, and the second heat source cooling operation is thus implemented. Moreover, the second HVA cooling operation can also be implemented in the second switched position, wherein part of the coolant in this instance at the corresponding junction downstream of the chiller is not guided to the second inlet, but to the high-voltage accumulator. The second actuator is configured as a 3/2-way valve. The previous explanations apply in an analogous manner to the alternative positioning of the second actuator.

In an embodiment, as a further switched state, a fourth switched state in which the HVA circuit upstream and downstream of the heat source is connected to the cooling circuit in such a manner that the heat source is connected in parallel with the high-voltage accumulator and the chiller, and that the chiller is disposed downstream of the first ambient cooler and upstream of the high-voltage accumulator. The possibility of implementing a third HVA cooling operation in which the high-voltage accumulator is cooled by means of the chiller as well as by way of the cooling circuit, or exclusively by way of the cooling circuit, and especially by way of the first ambient cooler, advantageously results in the fourth switched state. Moreover, the first heat source cooling operation for cooling the heat source by way of the first ambient cooler is advantageously also able to be set simultaneously with the third HVA cooling operation. Differences in comparison to the third switched state lie in that the chiller in the fourth switched state is connected in series only with the high-voltage accumulator but not to the heat source, and in that the high-voltage accumulator is connected in series with the first ambient cooler. The latter especially results in that the high-voltage accumulator henceforth is no longer cooled only indirectly by mixing coolant by way of the first ambient cooler, as has been described above, but in that the entire coolant from the high-voltage accumulator is also guided to the first ambient cooler since the first ambient cooler is now not disposed on a sub-branch so as to be parallel with the high-voltage accumulator but lies on a main train into which both sub-branches open. However, it is significantly more relevant that no heat source is disposed between the ambient cooler and the high-voltage accumulator such that the coolant reaches the high-voltage accumulator at a low temperature level. Optimal cooling is guaranteed in the third HVA cooling operation and also better cooling than in the second HVA cooling operation. The third HVA cooling operation is advantageously used should the coolant downstream of the first ambient cooler have a lower temperature than downstream of the high-voltage accumulator, that is to say should the ambient temperature be lower than the temperature of the high-voltage accumulator. In this case, exhaust heat from the high-voltage accumulator can be dissipated to the environment. However, the temperature of the high-voltage accumulator per se can be significantly above the temperature of the coolant at the high-voltage accumulator such that the latter temperature is not mandatorily higher than the ambient temperature. The third HVA cooling operation in comparison to pure ambient cooling of the high-voltage accumulator has the advantage that optimal cooling of the high-voltage accumulator by means of the chiller is implemented even at a high ambient temperature at which the exhaust heat of the high-voltage accumulator cannot be completely dissipated to the environment. By contrast, the third HVA cooling operation in comparison to pure cooling by means of the chiller is advantageous on account of exhaust heat from the high-voltage accumulator being dissipated to the largest possible extent to the environment and the chiller being used only in a supporting manner. The refrigeration circuit in the third HVA cooling operation in comparison with pure cooling by means of the chiller is correspondingly de-stressed and therefore operated at a lower output such that energy is correspondingly saved. By contrast, in one suitable variant the refrigeration circuit is conversely operated at full output and is cooled in a supporting manner by way of the ambient cooler.

The third HVA cooling operation, by virtue of the combined discharging of heat from the high-voltage accumulator by way of the chiller as well as by way of the ambient cooler, is also referred to as a combination cooling operation. The coolant for the high-voltage accumulator is first pre-cooled by the first ambient cooler and thereafter, depending on the requirement, is additionally further cooled by means of the chiller or is not further cooled. Accordingly, the chiller does not have to be mandatorily activated in the third HVA cooling operation, in the case of the cooling by way of the environment already being sufficient.

In an embodiment, a third actuator in the HVA circuit is disposed upstream of the chiller, said third actuator having two switched positions, specifically a first switched position in which the high-voltage accumulator is not connected in series with the first ambient cooler, and a second switched position in which the HVA circuit upstream of the chiller is connected to the cooling circuit such that the first ambient cooler, the chiller, and the high-voltage accumulator are connected in series in such a manner that the chiller for setting the fourth switched state is disposed downstream of the first ambient cooler and upstream of the high-voltage accumulator.

The third actuator is a valve. The third actuator in the HVA circuit is disposed between the chiller and the first actuator. This results in that the third actuator in the first switched position is disposed downstream of the first actuator, but in the second switched position conversely the first actuator is disposed downstream of the third actuator. The third actuator has one outlet and two inlets, specifically a first inlet and a second inlet. The outlet is disposed upstream of the chiller, the first inlet is disposed downstream of the high-voltage accumulator, and the second inlet is disposed downstream of the first ambient cooler. The third actuator in the HVA circuit is thus disposed upstream of the chiller and downstream of the high-voltage accumulator, as well as also disposed downstream of the third connector point. The third actuator is configured for guiding coolant from the first ambient cooler by way of the second inlet into the HVA circuit. The first inlet is opened in the first switched position such that coolant is guided from the high-voltage accumulator to the chiller. By contrast, the second inlet is opened in the second switched position such that the coolant from the high-voltage accumulator is guided by way of the second connecting line into the cooling circuit and to the ambient cooler, proceeding therefrom by way of the third actuator to the chiller, and finally back to the high-voltage accumulator. The third actuator in an embodiment is configured as a 3/2-way valve.

In an embodiment for the fourth switched state, a cooler junction is configured downstream of the first ambient cooler such that two sub-branches, specifically a first sub-branch and a second sub-branch among which the coolant is correspondingly divided, are configured downstream of said cooler junction. Stated differently, a first sub-branch and a second sub-branch extend so as to proceed from the cooler junction. The first sub-branch contains a supply flow for the heat source, and the second sub-branch upstream of the chiller leads into the HVA circuit and continues in the latter, thus comprising parts of the HVA circuit. The two sub-branches terminate conjointly, downstream of the heat source, expediently in the fourth connector point such that the coolant at the latter is converged again and as an entity is guided to the first ambient cooler again. The second sub-branch contains parts of the HVA circuit, above all the chiller and the high-voltage accumulator, as well as a fourth connecting line which leads from the cooler junction to the HVA circuit, that is to say to the third actuator. The first sub-branch contains the heat source such that the heat source, in the fourth switched state, is overall connected in parallel with the HVA circuit.

In the fourth switched state, the flow direction of the coolant on the second connecting line, from the HVA circuit to the cooling circuit downstream of the heat source, is reversed. However, the flow direction on all other line portions advantageously remains the same, independently of the switched state. On account thereof, the heat system is able to be switched in a simple manner and with a minor delay between different switched states and operating modes. The second actuator, if present, by virtue of the reversal of the flow direction on the second connecting line in the fourth switched state, is disposed at the end of the chiller bypass, as has already been described above. When positioned at the beginning of the chiller bypass, part of the coolant downstream of the chiller would flow to the ambient cooler and not to the high-voltage accumulator such that an additional shut-off valve would be required in order for this to be prevented.

As is derived from the above explanations, the high-voltage accumulator and the chiller in all four switched states are always connected in series, and the heat source and the first ambient cooler are likewise also always connected in series. The switching between two switched states in this instance serves for connecting the high-voltage accumulator in series also with the first ambient cooler, if required, or to connect the heat source in series with the chiller, if required.

In summary, the switched states described above and the operating modes in each case possible therein can be described as follows:

The following operating modes are possible in the first switched state:

A first HVA heating operation in which the high-voltage accumulator is heated by means of exhaust heat from the heat source. In terms of the heat source this simultaneously represents a cooling operation.

A trimming operation which is a variation of the first HVA heating operation and in which the heat source is trimmed so as to generate exhaust heat.

The following operating modes are possible in the second switched state:

A first HVA cooling operation in which the high-voltage accumulator is cooled by means of the chiller.

A homogenization operation in which the heat distribution within the high-voltage accumulator is homogenized such that the temperature spread is reduced and the temperatures of different cells of the high-voltage accumulator are equalized with one another.

A second HVA heating operation in which the high-voltage accumulator is heated by way of an HVA booster heater in the HVA circuit.

A first heat source cooling operation in which the heat source is cooled by way of the first ambient cooler, independently of the high-voltage accumulator.

The following operating modes are possible in the third switched state:

A second HVA cooling operation in which the high-voltage accumulator is connected in parallel with the first ambient cooler and is indirectly cooled by way of the latter in that it is exploited that the coolant from the first ambient cooler mixes with the coolant from the high-voltage accumulator flowing in parallel with the former, and an exchange of heat takes place on account thereof.

A second heat source cooling operation in which the heat source is able to be cooled by way of the chiller as well as the first ambient cooler, and is also cooled by at least one of said components.

The following operating modes are possible in the fourth switched state:

A third HVA cooling operation in which the high-voltage accumulator is able to be cooled by way of the chiller as well as the first ambient cooler, and is also cooled by way of at least one of said components.

The first heat source cooling operation, thus the cooling of the heat source by way of the first ambient cooler, is in principle possible also in the fourth switched state.

As becomes evident from said list, not all four switched states have to be implemented in order for a flexible temperature-control to be enabled. A thermal system in which at least the first and the second switched state are able to be set is already advantageous, because said two switched states in combination already enable a multiplicity of operating modes for catering for the most varied temperature requirements, specifically an energy-efficient heating of the high-voltage accumulator so as to meet demands and, in combination therewith or independently thereof, cooling of the heat source so as to meet demands. In principle however, other combinations of two or more switched states are also advantageous.

The switching between two switched states takes place by means of the first, the second, or the third actuator or a combination thereof, depending on which switched states are implemented and between which of said switched states switching is to take place. Proceeding from a thermal system having all three actuators, the following overview reflects the switched positions for setting a respective switched state:

| Switched state | Switched position, first actuator | Switched position, second actuator | Switched position, third actuator |
| --- | --- | --- | --- |
| 1$^{st}$ switched state | first | second | first |
| 2$^{nd}$ switched state | second | first | first |
| 3$^{rd}$ switched state | second | second | first |
| 4$^{th}$ switched state | second | first | second |

It becomes evident from the overview that not all actuators are necessarily required in a combination of only part of the four switched states. For example, the third actuator is not required for the first, the second, and the third switched state and is omitted should the fourth switched state not be required and also not be able to be set in a thermal system.

From the overview in conjunction with the description of the switched states it also is derived that the first actuator serves for connecting the high-voltage accumulator and the heat source either in series or not in series. The second actuator serves for connecting the chiller and the heat source either in series or not in series. The third actuator serves for connecting the high-voltage accumulator and the first ambient cooler either in series or not in series.

The operating modes within a respective switched state are set in that the HVA pump, the cooling circuit pump, and the chiller are correspondingly activated or deactivated. In as far as temperature-controlling of the high-voltage accumulator is to take place, the HVA pump is activated to this end. The cooling circuit pump is deactivated, in the case of the high-voltage accumulator being heated. In as far as temperature-controlling of the heat source is to take place, the cooling circuit pump is activated to this end. In as far as both pumps are activated, the extent of the respective temperature-controlling is expediently set in that a correspondingly suitable mutual ratio of the two pumps in terms of pump output is set. In as far as cooling is to take place by means of the chiller, the latter is correspondingly activated. The amount of heat which is transmitted from the chiller into the refrigeration circuit is set in that an opening of the expansion valve ahead of the chiller, or a compression output of the compressor, or both, is/are suitably set.

The first ambient cooler is combined with a second ambient cooler and conjointly with the latter forms a cooler pack in which the two ambient coolers are disposed in succession in an ambient air path. The first ambient cooler is also referred to as the high-temperature (HT) cooler. By contrast, the second ambient cooler is referred to as the LT cooler, that is to say as the low-temperature cooler. Stated differently, the second ambient cooler is passed through by a flow of cold coolant as the first ambient cooler. This is achieved in that the second ambient cooler in terms of the coolant is disposed downstream of the first ambient cooler, but in the ambient air path is disposed upstream of the first ambient cooler. Dual-stage cooling of the coolant correspondingly takes place by way of the cooler pack.

In an embodiment, a cooler junction is configured downstream of the first ambient cooler, as has already been described further above in the context of the fourth switched state. An LT branch and an HT branch extend so as to proceed from the cooler junction, wherein the HT branch forms a supply flow for the heat source, and wherein the LT branch downstream of the chiller is connected to the HVA circuit, wherein a second ambient cooler is connected to the LT branch upstream of the HVA circuit. The exchange of heat with the environment is significantly improved in this way. The LT branch corresponds to the fourth connecting line already mentioned above. The HT branch is completely part of the cooling circuit.

The cooler junction presently is disposed between the two ambient coolers such that the dual-stage cooling of the coolant is carried out only for the LT branch which leads to the HVA circuit. An extensively cooled coolant is thus available for cooling the high-voltage accumulator. By contrast, the heat source is supplied with a warmer coolant by way of the HT branch. The LT branch terminates at one of the inlets of the third actuator, specifically at that inlet which connects the HVA circuit to the cooling circuit upstream of the chiller. Accordingly, coolant by way of the LT branch is conveyed into the HVA circuit only in the fourth switched state. On account thereof, the cooling of the high-voltage accumulator in an operating mode in the fourth switched state is effective, because the coolant herein can be cooled in three stages, so to speak, and is also cooled in three stages, prior to said coolant reaching the high-voltage accumulator: specifically initially in the HT cooler, then in the LT cooler, and finally in the chiller.

An advantage of the various embodiments of the thermal system lies in that cabin air-conditioning for the vehicle can also be implemented in a simple way. The thermal system in this instance serves not only for temperature-controlling the high-voltage accumulator and the heat source, but also for temperature-controlling a cabin of the vehicle. The exhaust heat generated by said components herein is advantageously at least in part used for temperature-controlling the cabin instead of being dissipated to the environment, so that the thermal system is energy-efficient. In this context, one advantage of the circuitry of the comprehensive cooling circuit described above lies in that the cabin temperature-controlling can be implemented independently of the temperature-controlling of the high-voltage accumulator and the heat source, such that is guaranteed that various temperature-control requirements are catered for in an optimal manner and so as to meet demands in the most varied combinations.

The comprehensive cooling circuit for air-conditioning the cabin in an embodiment has a heating circuit to which a heating heat exchanger for heating cabin air for the electric or hybrid vehicle is connected. A condenser which is also connected to the refrigeration circuit and conjointly with the chiller forms a heat pump which in a heat pump operation is configured for transmitting heat from the chiller into the heating circuit is connected to the heating circuit. The heating circuit is able to be connected to the cooling circuit in such a manner that the condenser, the heating heat exchanger and the first ambient cooler are connected in series.

The heating heat exchanger and the condenser are two separate components. The condenser herein is a coolant/refrigerant condenser, thus a water-cooled condenser, WCC for short. By contrast, the condenser in a likewise suitable variant is simultaneously the heating heat exchanger and as part of the air-conditioning apparatus is correspondingly disposed in the air path for the cabin air. The latter in this instance is heated directly by means of the condenser such that the condenser is an air/refrigerant condenser, thus an air-cooled condenser, ACC for short.

The heat pump operation advantageously enables the utilization of exhaust heat from the high-voltage accumulator, from the heat source, from the air-conditioning evaporator, indirectly by way of the ambient cooler, or a combination thereof, for heating the cabin. On account of the connection in series with the first ambient cooler, excess heat from the heating circuit is also simultaneously able to be discharged to the environment by way of the first ambient cooler. The heating circuit accordingly also advantageously serves for discharging heat from the refrigeration circuit to the environment by way of the condenser. Overall, effective thermal management in which various temperature-controlling requirements are in each case catered for to meet demands in an efficient way is thus implemented by way of the heating circuit and the special integration of the latter in the comprehensive cooling circuit.

"Heat pump operation" presently is understood that the heat pump is activated, and heat is transmitted into the heating circuit by means of said heat pump. The way in which the heat therein is further utilized per se is initially not of importance in terms of the heat pump operation.

The heating circuit is initially configured as a third circuit of the comprehensive cooling circuit, so as to be separate from the HVA circuit and from the cooling circuit, and accordingly is able to be operated independently of the HVA circuit and of the cooling circuit. A pump, which is also referred to as the heating circuit pump, for conveying coolant in the heating circuit is disposed in the heating circuit.

The heating circuit, in a manner similar to the HVA circuit, is expediently linked to the cooling circuit by way of connecting lines, by way of a heating supply flow and a heating return flow. The heating supply flow for implementing the connection in series of the condenser, the heating heat exchanger, and the first ambient cooler, is connected to the cooling circuit downstream of the first ambient cooler. The condenser and the heating heat exchanger follow upstream of the heating supply flow, wherein the condenser is disposed upstream of the heating heat exchanger such that heat which reaches the heating circuit is initially able to be used for temperature-controlling the cabin prior to a dissipation to the environment taking place by way of the cooling circuit.

The heating circuit overall is configured as a circulation, having a main train and a return train. The main train extends from the heating supply flow and downstream of the latter up to the heating return flow, while the return train in this instance extends in the opposite direction. The return train in this instance serves for returning the coolant and for re-conveying the latter through the main train in the case of the heating circuit being operated separately from the cooling circuit. The condenser and the heating heat exchanger are connected to the main train such that said components are able to be reliably passed through by a flow of coolant, independently of whether or not the heating circuit is separate from the cooling circuit. The heating circuit pump is also expediently disposed on the main train. A check valve so as to suppress any bypassing of the condenser is disposed on the return train. Apart from the check valve, no further components are disposed on the return train such that the return train serves only for returning the coolant into the main train and is also easier to vent.

The heating system for temperature-controlling the cabin has an air-conditioning evaporator which generally is an evaporator and is connected to the refrigeration circuit. The air-conditioning evaporator in the refrigeration circuit is connected in parallel with the chiller. An adjustable expansion valve, a self-regulating expansion valve which can be electrically shut off, for short an eTXV, for setting the cooling output of the air-conditioning evaporator is expediently disposed upstream of the air-conditioning evaporator in the refrigeration circuit. The refrigeration output of the refrigeration circuit is in this instance distributed among the air-conditioning evaporator and the chiller by correspondingly setting the expansion valves ahead of the chiller and the air-conditioning evaporator. The overall air-conditioning output is set by means of the compressor and also by means of a fan as part of a cooler pack having the ambient cooler. In order to prevent a return flow of refrigerant into the air-conditioning evaporator and, on account thereof, in inadequate filling of the suction line of the refrigeration circuit in the case of a deactivated air-conditioning evaporator and an activated chiller, a check valve in the refrigeration circuit is expediently disposed downstream of the evaporator and upstream of a junction toward the chiller.

The heating heat exchanger and the air-conditioning evaporator conjointly form an air-conditioning apparatus by means of which the cabin can be heated as well as cooled as well as dehumidified. The air-conditioning apparatus has an air path by way of which air reaches the cabin of the vehicle. The cabin in this instance is temperature-controlled in that the air which is fed to the cabin, that is to say the cabin air, is temperature-controlled in a corresponding manner. To this end, the air-conditioning evaporator and the heating heat exchanger are disposed in the air path and are passed by a nomination flow of the cabin air. The heating heat exchanger in the air path is expediently disposed downstream of the air-conditioning evaporator such that an effective dehumidification of the cabin air is also enabled.

By virtue of the heating heat exchanger and the air-conditioning evaporator, three further operating modes, specifically a cabin heating, a cabin cooling, and a dehumidification are able to be set in the thermal system, wherein the dehumidification is ultimately a combination of the cabin heating and the cabin cooling. Said operating modes are collectively also referred to as air-conditioning operating modes. In the cabin heating, heat from the heating circuit is dissipated to the cabin air by way of the heating heat exchanger, and said heat is directed as flow into the cabin. Conversely, in the cabin cooling, heat is extracted from the cabin air by means of the evaporator, and said heat is transmitted into the refrigeration circuit, and the cooled cabin air is then directed as flow into the cabin. In an embodiment, the heat required for the cabin heating and the dehumidification is provided by means of the heat pump operation.

In an embodiment, the heating circuit is able to be connected to the cooling circuit by way of a fourth actuator which has two switched positions, specifically a first switched position in which the heating circuit for heating the cabin air is separated from the cooling circuit, and a second switch position in which the heating circuit for discharging heat from the heating circuit into the cooling circuit is connected to the cooling circuit. A advantage of the present thermal system is that the fourth actuator is able to be switched independently of the respective switched state of the first, the second, and the third actuator such that there is the possibility of either connecting the heating circuit to the cooling circuit or of separating said heating circuit from the latter in each of the four mentioned switched states, depending on how the cabin is to be temperature-controlled. A mixed operation in which the fourth actuator is repeatedly opened and closed, that is to say operated in a cycled manner, so as to discharge only part of the heat is also able to be set in an embodiment. Alternatively, a proportional valve, that is to say a valve having an adjustable opening cross section, is also suitable.

The fourth actuator is a valve, suitably a shut-off valve. The fourth actuator in the first switched position is closed, and opened in the second switched position. In an embodiment, the fourth actuator and the check valve in the return train are combined in a single 3-way valve. The fourth actuator is disposed either in the heating supply flow or in the heating return flow.

The special circuitry of the thermal system advantageously enables the first, the second, the third, and the fourth actuator, in as far as in each case present, to be combined in a single multi-valve. The thermal system an embodiment therefore has a multi-valve which is simultaneously the first, the second, the third, and the fourth actuator. To this end, the multi-valve is configured having a suitable number of inlets and outputs and is connected to the circuit. A corresponding multi-valve is the subject matter of an application filed in parallel with the present application.

The heat pump in the heat pump operation is activated, and heat from the chiller in the HVA circuit is transmitted to the condenser in the heating circuit. Said heat, in an embodiment, is fed to the heating heat exchanger and used for the cabin heating. By contrast, should no cabin heating have to take place, the heat is expediently dissipated to the environment by way of the first ambient cooler and, to this end, the heating circuit is connected to the cooling circuit. To this end, the fourth actuator is opened such that the condenser, the heating heat exchanger, and the first ambient cooler in this instance are connected in series. Heating by way of the heating heat exchanger in this instance is avoided in that said heating heat exchanger is shut off at the air side. Stated differently, while warm coolant potentially flows through the heating heat exchanger, no air recirculation however takes place in the air path such that no heated cabin air is fed to the cabin, and the cabin is correspondingly not heated. In order for the heating heat exchanger to be shut off at the air side, a corresponding shut-off device, for example a flap, is expediently disposed in the air path.

In an embodiment, a heating circuit booster heater for feeding additional heat into the heating circuit is disposed in the heating circuit downstream of the condenser and upstream of the heating heat exchanger, and on the main train. The heating circuit booster heater in a simple manner enables heating of the cabin in such cases in which no or insufficient heat is transmitted from the heat pump into the heating circuit, and in this instance is suitably activated. Alternatively or additionally to the heating circuit booster heater, an airside booster heater in the air path for the cabin air is also conceivable and suitable. Such an airside booster heater in the air path is expediently disposed downstream of the heating heat exchanger.

Having an HVA booster heater is also advantageous in combination with the heating circuit. In the case of cabin heating having to take place but insufficient heat being present therefor in the heating circuit, the HVA booster heater is activated when heating the cabin, and the exhaust heat of said HVA booster heater is transmitted into the heating circuit by way of the heat pump. The heating circuit booster heater can therefore be dimensioned so as to be correspondingly smaller or be entirely omitted. In an embodiment, the HVA booster heater and the heating circuit booster heater have in each case an output in the range from 4 kW to 6 kW.

The HVA booster heater is expediently disposed in such a manner that said HVA booster heater is passed through by a flow of only that coolant that circulates in the HVA circuit, thus indeed not directly ahead of or behind the chiller, the latter in various switched states of the thermal system potentially being additionally passed through by a flow of coolant from the cooling circuit. Instead, the HVA booster heater is disposed on a secondary train of the HVA circuit. This disposal in the secondary train is more advantageous in terms of the dimensioning of the cooling circuit pump. Less pump output is required in this instance and the flow resistance of the HVA booster heater does not have to be overcome. By contrast, an HVA booster heater is entirely dispensed with in one advantageous variant.

The HVA booster heater or the heating circuit booster heater, or both, is/are in each case configured as an electric flow-type heater, for example.

A cabin temperature control which meets requirements is overall advantageously guaranteed in various ways in each switched state and depending on the operating mode in terms of the high-voltage accumulator and the heat source. In order for a cabin heating to be set, the heat pump is generally activated, or the heating circuit booster heater, or both. The fourth actuator when heating the cabin is expediently switched to the first switched position.

When heating the cabin in the first switched state, excess exhaust heat from the heat source is used and transmitted into the heating circuit by means of the heat pump. When heating the cabin in the second and in the fourth switched state, exhaust heat from the high-voltage accumulator is transmitted into the heating circuit by means of the heat pump. When heating the cabin in the third switched state, exhaust heat from the heat source or from the high-voltage accumulator, or from both, is transmitted into the heating circuit by means of the heat pump. Should the heat which is transmitted by the heat pump not be sufficient, or in the case of the heat pump not being activated at all, additional heat is generated by means of the heating circuit booster heater. When the heat pump is activated, heat is alternatively or additionally generated by means of the HVA booster heater.

If no heating of the cabin is to take place, the heat in the heating circuit is discharged by way of the first ambient cooler. To this end, the heating circuit is connected to the cooling circuit, in that the fourth actuator is switched to the second switched position.

When cooling the cabin, heat from the cabin air is transmitted into the refrigeration circuit by means of the air-conditioning evaporator. This heat is expediently transmitted into the heating circuit by way of the condenser and from there into the cooling circuit, and by way of the first ambient cooler to the environment. When dehumidifying, the heat of the air-conditioning evaporator however is at least in part expediently used for reheating the cabin air after the cooling. Alternatively, the air-conditioning evaporator and the chiller are disposed in separate refrigeration circuits, and the refrigeration circuit to which the air-conditioning evaporator is connected has a condenser which is, for example, air-cooled and which is at least not connected to the comprehensive cooling circuit.

The heating circuit and the HVA circuit are not connected to one another. Stated differently, the heating circuit and the HVA circuit are in each case linked to the cooling circuit and to this extent are indirectly but not directly connected to one another. This is in contrast to the coupling as described in DE 10 2015 220 623 A1, cited at the outset. The heating circuit and the HVA circuit are not connected in series in any of the four switched states, but are either connected in parallel or are mutually separated.

In an embodiment having a first and the second ambient cooler, as has already been described above, the heating supply flow is connected to the LT branch downstream of the second ambient cooler. This is independent of whether the LT branch likewise leads to the HVA circuit. An embodiment in which no fourth switched state is able to be set, and in which the LT branch in this instance does not lead to the HVA circuit and leads only to the heating circuit is thus also advantageous.

The advantage of supplying the high-voltage accumulator with coolant by way of the LT branch in an analogous manner applies also to the supply of the heating circuit with coolant from the LT branch. The coolant which flows into the heating circuit has a low temperature such that any heat which is to be discharged from the heating circuit and to be dissipated to the environment is absorbed and discharged in an effective manner. The refrigeration circuit herein is more efficient and of higher output the lower the temperature of the coolant upstream of the condenser.

The thermal system expediently has an equalization volume for the coolant. A single equalization volume is already sufficient by virtue of the cooling circuit, the heating circuit, and the HVA circuit being hydraulically coupled. The equalization volume is therefore the only equalization volume for coolant in the thermal system. The equalization volume is also referred to as an equalization container. In an embodiment, the equalization volume for exchanging liquid coolant is connected to the cooling circuit downstream of the first ambient cooler and upstream of the cooler junction. Furthermore, the equalization volume for exchanging air is connected to the first ambient cooler and optionally also to the second ambient cooler.

In an embodiment, an HVA check valve in the HVA circuit is disposed downstream of the high-voltage accumulator. The HVA check valve has two advantageous functions. The HVA check valve, in the second heat source cooling operation, prevents that such coolant which has been heated by the heat source reaches the high-voltage accumulator and is unintentionally heated by the latter, on the one hand, and herein simultaneously unintentionally also bypasses the chiller, on the other hand. The HVA check valve is expediently disposed upstream of the third connector point and upstream of the first connector point such that the coolant in the second heat source cooling operation does not flow through the HVA check valve on account of which corresponding pressure loss is advantageously avoided.

In an embodiment, an HVA shut-off valve is disposed upstream of the high-voltage accumulator and downstream of the HVA pump. The HVA shut-off valve is configured in such a manner that said HVA shut-off valve in the non-energized state is closed, that is to say has to be actively energized in order to be kept open. On account thereof it is prevented in the event of a defect, in combination with the HVA check valve mentioned above, that the high-voltage accumulator is flooded with coolant, in which case there is the fundamental risk of electrical shorting. The event of a defect is, for example, a crash of the vehicle, or a leakage in the high-voltage accumulator, for example by virtue of material fatigue. The high-voltage accumulator in combination with the HVA check valve, in this instance is encapsulated in fluidic terms, specifically upstream by way of the HVA shut-off valve and downstream by way of the HVA check valve.

In an embodiment, a first temperature sensor for measuring the temperature of the coolant when exiting the corresponding ambient cooler is disposed downstream of the first ambient cooler and, if present, even downstream of the second ambient cooler. Furthermore, a second temperature sensor for measuring the temperature of the coolant when exiting the high-voltage accumulator is disposed downstream of the high-voltage accumulator. The thermal system is configured in such a manner that the third HVA cooling operation is set when the temperature of the coolant when exiting the ambient cooler is lower than the temperature of the coolant when exiting the high-voltage accumulator, thus when the first temperature sensor measures a lower temperature than the second temperature sensor. Depending on the temperature of the coolant when exiting the ambient cooler, the chiller is expediently also activated and the output of the latter is set for discharging additional heat into the refrigeration circuit.

A check valve which in the first HVA heating operation advantageously prevents that the cooler is passed through by a return flow is disposed on the third connecting line between the HVA circuit downstream of the chiller and the cooling circuit. The check valve is disposed upstream of the second actuator and ahead of the second inlet of the latter.

In summary, the following advantages which, may be implemented individually or in combination are derived by virtue of the embodiments of the thermal system:

The thermal system enables efficient heating of the cabin by means of the heat pump by utilizing the exhaust heat from the heat source, the high-voltage accumulator, and optionally from the environment.

Powerful cooling of the high-voltage accumulator to meet the demands by means of the chiller, thus overall by means of the heat pump, is possible especially at high ambient temperatures.

By contrast, energy-efficient cooling of the high-voltage accumulator to meet the demands by means of the first and optionally also the second ambient cooler is possible at lower and moderate ambient temperatures.

Various components are used in multiple ways on account of the special circuitry of the components of the thermal system, in the comprehensive cooling circuit and by means of the different actuators, that is to say used for implementing different operating modes. This multiple use leads to a significant reduction in costs, since corresponding components are not present in multiples but are used in different operating modes. This relates, for example, to the heat pump which is used for cooling the high-voltage accumulator, on the one hand, and for cooling the heat source or for cooling both the heat source and the high-voltage accumulator, on the other hand, and additionally either discharges the heat to the environment or utilizes said heat for heating the cabin.

The special circuitry also leads to an improved reliability in the event of a defect. It is possible for the high-voltage accumulator to be protected in relation to flooding with coolant and electrical shorting associated therewith, without disadvantageously influencing other parts of the thermal system on account thereof.

Improved driving dynamics, efficiency, and rapid-charging capability are derived on account of the heating of the high-voltage accumulator. Heating of the high-voltage accumulator herein is possible in various ways, specifically by way of an additional HVA booster heater or by way of exhaust heat from the heat source, or by way of a targeted trimming of the heat source.

Cooling of the high-voltage accumulator is possible by means of the heat pump as well as directly by way of the environment such that a corresponding increase in terms of output and efficiency results.

In the case of an additional HVA booster heater being present, a heating circuit booster heater in the heating circuit for heating the cabin can be dimensioned so as to be smaller since the heat pump also enables the HVA booster heater to be used for heating the cabin.

The thermal system in terms of construction is simple and uses few components for implementing numerous operating modes.

When switching the thermal system between different switched states or operating modes, no reversal, or substantially no reversal, of the flow of the coolant takes place such that the thermal system is responsive and temperature-control requirements are able to be catered for in a short time. Few switching procedures are required for switching, on account of which acoustic advantages are correspondingly derived.

The thermal system on account of the multiple use of components and the special circuitry is overall compact, low-maintenance, efficient in terms of installation space, and light.

An electric or hybrid vehicle according to the disclosed subject matter has a thermal system as has been described above.

In the method for operating the thermal system, one of the four switched states and correspondingly suitable operating modes are set depending on the temperature-controlling demand. A temperature-controlling demand is a cooling demand or a heating demand. In the case of a cooling demand, the corresponding component is to be cooled, and correspondingly heated in the case of a heating demand.

In the event of a heating demand for the high-voltage accumulator, the first switched state is set and the first HVA heating operation in which the high-voltage accumulator is heated using exhaust heat from the heat source is set in said first switched state. Moreover, the HVA pump in the HVA circuit is activated so as to recirculate coolant herein for the first HVA heating operation. The cooling circuit pump in the cooling circuit is deactivated.

In an embodiment, the heat source is a component of a drivetrain of the electric or hybrid vehicle, and in the case of a heating demand for the high-voltage accumulator the first switched state is set and a trimming operation in which the heat source is trimmed is additionally set in said first switched state such that said heat source generates exhaust heat by way of which the high-voltage accumulator is heated. The trimming operation is set additionally to the first HVA heating operation when the exhaust heat of the heat source is not sufficient for heating the high-voltage accumulator.

In an embodiment, in the event of a temperature-controlling demand for the high-voltage accumulator, or a cooling demand for the heat source, or both, a second switched state is set in which the HVA circuit and the cooling circuit are mutually separated such that the chiller is separated from the cooling circuit and such that the first ambient cooler is separated from the HVA circuit.

Furthermore, one of the following operating modes is set herein, depending on which temperature-controlling demand is specifically present. Should there be a cooling demand for the high-voltage accumulator, a first HVA cooling operation in which the chiller is activated and coolant is conveyed in the HVA circuit such that the high-voltage accumulator is cooled by means of the chiller is set. Should the high-voltage accumulator be temperature-controlled in a non-homogeneous manner, a homogenization operation in which the chiller is deactivated and coolant is conveyed in the HVA circuit such that a temperature spread within the high-voltage accumulator is reduced is set. Should there be a heating demand for the high-voltage accumulator, a second HVA heating operation is set in which an HVA booster heater in the HVA circuit is activated and coolant is conveyed in the HVA circuit such that the high-voltage accumulator is heated. The second HVA heating operation is chosen instead of the first HVA heating operation when no exhaust heat for heating the high-voltage accumulator is available by means of the heat source. Should there be a cooling demand for the heat source, a first heat source cooling operation is set in which exhaust heat of the heat source is discharged by way of the cooling circuit.

In an embodiment, in the event of a cooling demand for the high-voltage accumulator or for the heat source, or both, a third switched state in which the HVA circuit is connected to the cooling circuit upstream and downstream of the chiller such that the heat source, the chiller, and the first ambient cooler are connected in series in such a manner that the heat source is disposed upstream of the chiller and the first ambient cooler is disposed downstream of the chiller is set.

Furthermore, one of the following operating modes is set herein, depending on which temperature-controlling demand is specifically present. Should there be a cooling demand for the high-voltage accumulator, a second HVA cooling operation is set in which coolant is conveyed in the heating circuit as well as in the cooling circuit, the coolant is cooled in the cooling circuit and is mixed with the coolant in the HVA circuit such that the high-voltage accumulator is cooled indirectly by way of the cooling circuit. Should there be a cooling demand for the heat source, a second heat source cooling operation is set in which the heat source is cooled by means of the chiller. The second heat source cooling operation is set when sufficient cooling of the heat source by way of the first ambient cooler is not possible, for example by virtue of high ambient temperatures, or should there be a heating demand for the cabin of the vehicle and the exhaust heat from the heat source is used for heating the cabin. The second HVA cooling operation is set when, additionally to the second heat source cooling operation, there is a cooling demand for the high-voltage accumulator.

In an embodiment, in the event of a cooling demand for the high-voltage accumulator, a fourth switched state is set in which the HVA circuit upstream and downstream of the heat source is connected to the cooling circuit in such a manner that the heat source is connected in parallel with the high-voltage accumulator and the chiller, and that the chiller is disposed upstream of the first ambient cooler and downstream of the high-voltage accumulator. Furthermore, a third HVA cooling operation is set in which the high-voltage accumulator is cooled by means of the chiller as well as by way of the cooling circuit, or only by way of the cooling circuit; should the chiller be deactivated. The third HVA cooling operation is set when sufficient cooling of the high-voltage accumulator is not possible by means of the previously mentioned HVA cooling operations.

In addition to the various operating modes for temperature-controlling the high-voltage accumulator and the heat source, in the case of a further temperature-controlling demand for the cabin of the vehicle a corresponding air-conditioning operation as has already been described is also additionally set.

Other objects, advantages and novel features of the present subject matter will become apparent from the following detailed description of one or more preferred embodiments when considered in conjunction with the accompanying drawings.

DETAILED DESCRIPTION OF THE DRAWINGS

Figure 1:
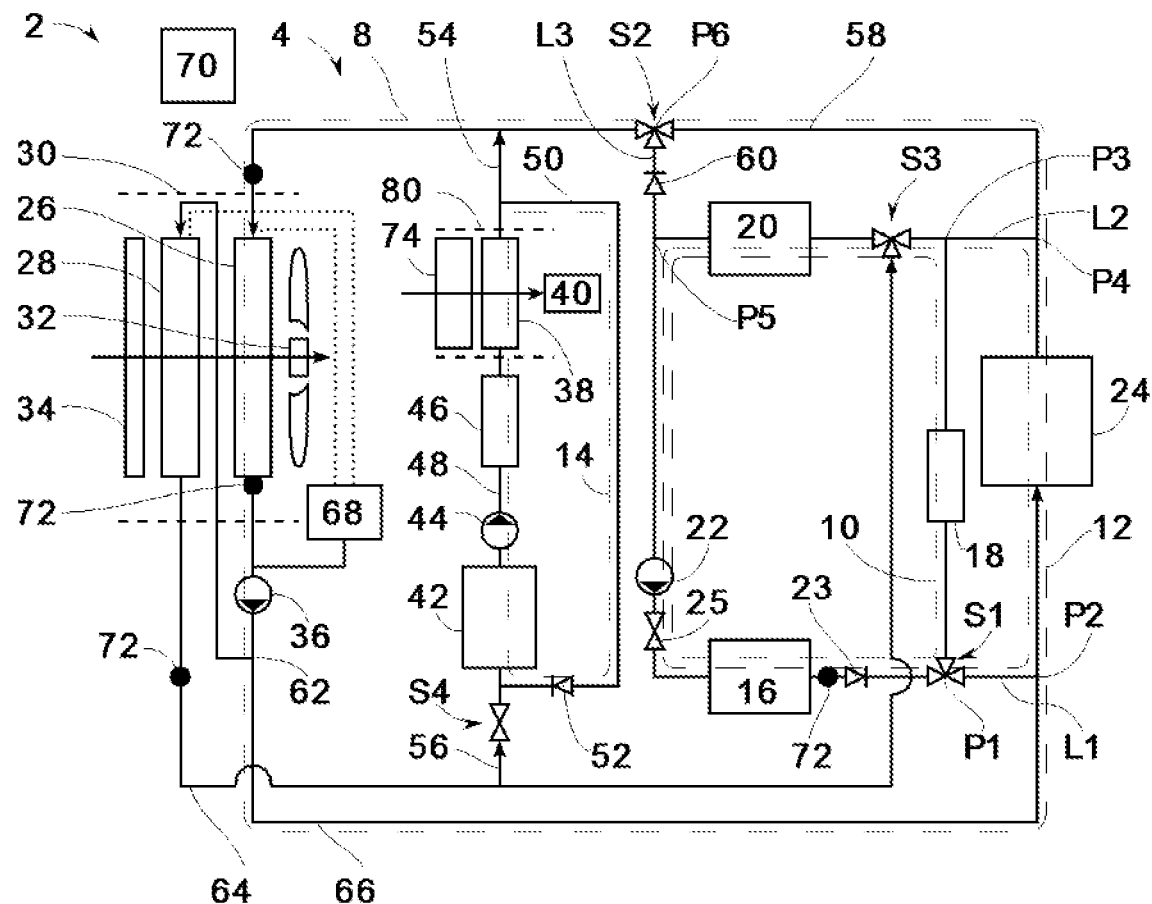
FIG. 1 shows a thermal system.
Figure 2:
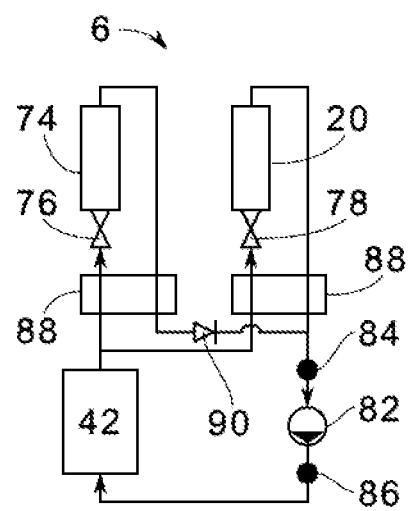
FIG. 2 shows a refrigeration circuit of the thermal system.
Figure 3:
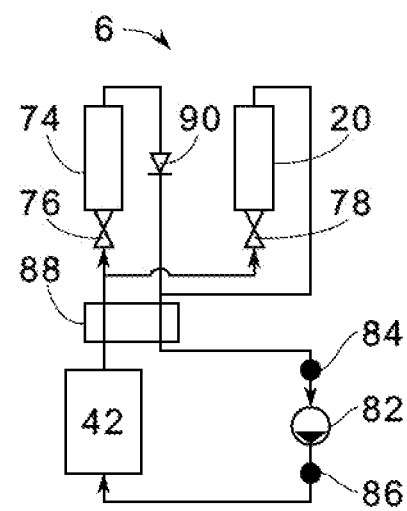
FIG. 3 shows a variant of the refrigeration circuit.
Figure 4:
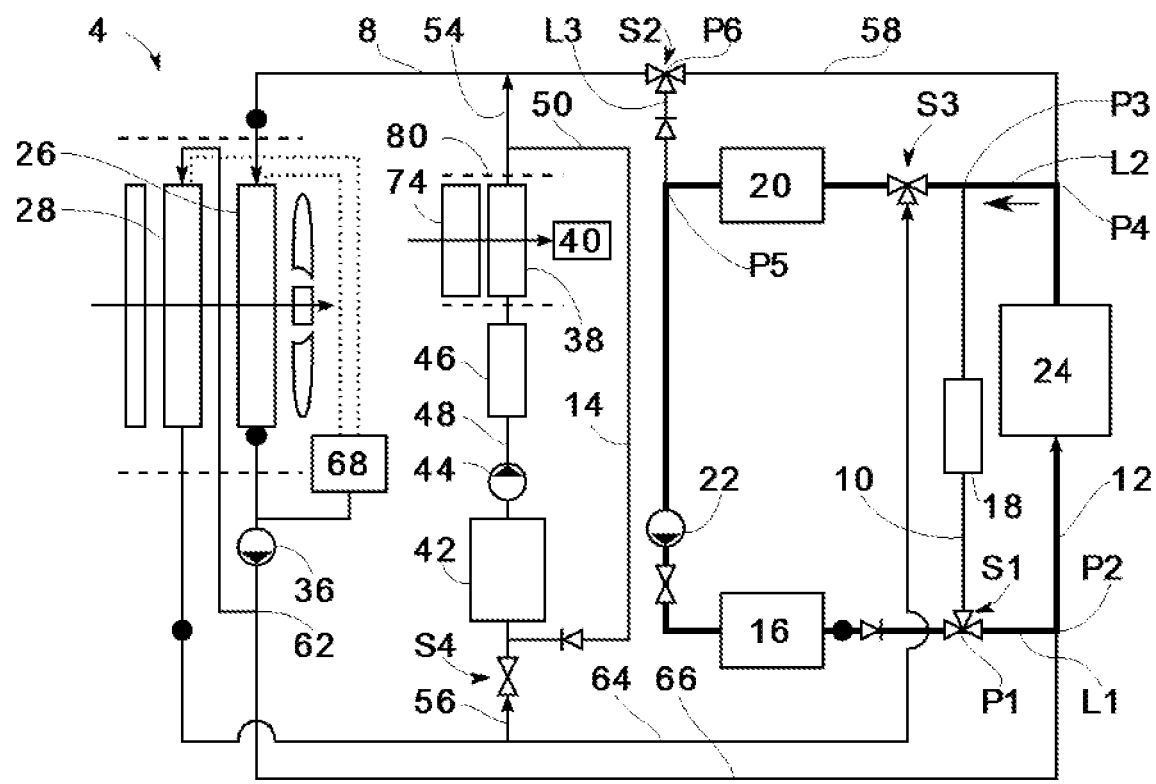
FIG. 4 shows a first switched state.

A thermal system 2 which is configured for use in an electric or hybrid vehicle which is not shown in more detail and is also referred to simply as the vehicle is shown in FIG. 1. The thermal system 2 has a comprehensive cooling circuit 4 as well as a refrigeration circuit 6 which is not illustrated in FIG. 1. Two variants of the refrigeration circuit 6 are shown in FIGS. 2 and 3. The thermal system 2 furthermore has a plurality of switched states, presently four of the latter. FIGS. 4 to 7 show in each case the comprehensive cooling circuit 4 in the various switched states of the thermal system 2. However, the thermal system 2 does not mandatorily have to have the combination of four switched states shown here. In a variant of the thermal system 2 (not shown here) not all of the four switched states described here are thus able to be set, on account of which corresponding simplifications result.

The comprehensive cooling circuit 4 in the embodiment shown has a plurality of circuits 8, 10, 12, 14, specifically a cooling circuit 8, a high-voltage accumulator (HVA) circuit 10, an extended HVA circuit 12, and a heating circuit 14. For improved clarity, the circuits 8, 10, 12, 14 in FIG. 1 are additionally indicated by dashed lines. It becomes evident herein that the extended HVA circuit 12 has overlaps with the HVA circuit 10 and the cooling circuit 8. In principle, the heating circuit 14 can also be omitted or be separately implemented, but an integration in the comprehensive cooling circuit 4, such as in FIG. 1 for example, is advantageous.

A high-voltage accumulator 16 for supplying power to an electric drivetrain of the electric or hybrid vehicle is connected to the HVA circuit 10. Furthermore, an HVA booster heater 18 is connected to the HVA circuit 10, said HVA booster heater 18 in a variant not shown however being dispensed with. Furthermore, a chiller 20 which is also connected to the refrigeration circuit 6 is connected to the HVA circuit 10. Furthermore, an HVA pump 22 for recirculating coolant is disposed in the HVA circuit 10. An HVA check valve 23 is disposed downstream of the high-voltage accumulator. An HVA shut-off valve 25 which in combination with the HVA check valve 23 fluidically encapsulates the high-voltage accumulator 16 is disposed upstream of the high-voltage accumulator 16.

A heat source 24 of the vehicle is connected to the cooling circuit 8. The heat source 24 is also connected to the extended HVA circuit 12. A first ambient cooler 26 for exchanging heat with the environment is connected to the cooling circuit 8 downstream of the heat source 24. The first ambient cooler 26 in the embodiment shown is combined with a second ambient cooler 28 so as to form a cooler pack. In principle however, an embodiment without the second ambient cooler 28 is also possible. Both ambient coolers 26, 28 are disposed in succession in an ambient air path 30, wherein the second ambient cooler 28 in terms of the coolant is disposed downstream of the first ambient cooler 26, but in the ambient air path 30 is disposed upstream of the first ambient cooler 26. A fan 32 for suctioning ambient air is disposed in the ambient air path 30 downstream of the two ambient coolers 26, 28. A number of air flaps 34 for controlling the supply of ambient air are disposed upstream of the two ambient coolers 26, 28. Furthermore, a cooling circuit pump 36 is disposed in the cooling circuit 8, here so as to be downstream of the first ambient cooler 26 and upstream of the heat source 24.

The heating circuit 14 serves for air-conditioning the cabin. A heating heat exchanger 38 for heating cabin air for a cabin 40 of the vehicle is connected to the heating circuit 14. Furthermore, a condenser 42 which is also connected to the refrigeration circuit 6 and conjointly with the chiller 20 forms a heat pump is connected to the heating circuit 14, said heat pump in a heat pump operation being configured for transmitting heat from the chiller 20 into the heating circuit 14. Furthermore, a heating circuit pump 44, as well as a heating circuit booster heater 46, are disposed in the heating circuit 14. The condenser 42, the heating circuit pump 44, the heating circuit booster heater 46, and the heating heat exchanger 38 in the sequence mentioned are disposed so as to be mutually downstream on a main train 48 of the heating circuit 14 in the embodiment shown. The circuit in this instance is closed by way of a return train 50 of the heating circuit 14, and a circulation of coolant is enabled by the latter. Only one check valve 52 is disposed in the return train 50. The heating circuit 14 by way of a heating circuit supply flow 54 and a heating circuit return flow 56 is connected to the cooling circuit 8 in such a manner that the main train 48 and the components connected thereto are disposed in series with the first ambient cooler 26.

The HVA circuit 10 is likewise linked to the cooling circuit 8 but not to the heating circuit 14. The HVA circuit 10 upstream of the heat source 24 is connected to the cooling circuit 8 by means of a first connecting line L1, and downstream of the heat source 24 is connected by means of a second connecting line L2. The first connecting line L1 herein is connected to the HVA circuit 10 at a first connector point P1, and is connected to the cooling circuit 8 at a second connector point P2. The second connecting line L2 is connected to the HVA circuit 10 at a third connector point P3, and is connected to the cooling circuit 8 at a fourth connector point P4. The first connector point P1 and the third connector point P3 in the HVA circuit 10 are both disposed downstream of the high-voltage accumulator 16 and upstream of the chiller 20. A connection of the high-voltage accumulator 16 and the heat source 24 in series is possible by means of the connecting lines L1, L2.

Furthermore, the HVA circuit 10 and the cooling circuit 8 are presently connected by means of a third connecting line L3 which in the HVA circuit 10 commences at a fifth connector point P5, downstream of the chiller 20 and upstream of the high-voltage accumulator 16, and at a six connector point P6, downstream of the heat source 24 and upstream of the first ambient cooler 26, opens into the cooling circuit 8. On account thereof, a line portion of the cooling circuit 8 between the fourth connector point P4 and the sixth connector point P6 is configured as a chiller bypass 58. A connection of the heat source 24, the chiller 20 and a first ambient cooler 26 in series can be implemented by means of the third connecting line L3. Moreover, a check valve 50 is disposed on the third connecting line L3 in the embodiment.

A cooler junction 62, proceeding from which an LT branch 64 and an HT branch 66 extend, is configured downstream of the first ambient cooler 26, wherein the HT branch 66 forms a supply flow for the heat source 24, and wherein the LT branch 64 downstream of the chiller 20 is connected to the HVA circuit 10. The second ambient cooler 28 is also connected to the LT branch 64 upstream of the HVA circuit 10. In this way, the exchange of heat with the environment is significantly improved. Moreover, the heating circuit 14 is presently connected to the LT branch 64 by way of the heating circuit supply flow 56. The LT branch corresponds to the fourth connecting line already mentioned above. The HT branch is completely part of the cooling circuit.

The thermal system 2 furthermore has an equalization volume 68 for the coolant. Moreover, the thermal system 2 for controlling has a control unit 70. Furthermore, temperature sensors 72 for measuring the temperature of the coolant are connected at various locations in the comprehensive cooling circuit 4.

The thermal system 2 for temperature-controlling the cabin additionally has an air-conditioning evaporator 74 which is connected to the refrigeration circuit 6. As is shown in FIGS. 2 and 3, the air-conditioning evaporator 74 in the refrigeration circuit 6 is connected in parallel with the chiller 20. A self-regulating expansion valve 76 which for setting the cooling output of the air-conditioning evaporator 74 can be electrically shut off is disposed upstream of said air-conditioning evaporator 74. An expansion valve 78 is disposed upstream of the chiller 20. The heating heat exchanger 38 and the air-conditioning evaporator 74 conjointly form an air-conditioning apparatus by means of which the cabin 40 can be heated as well as cooled as well as dehumidified. The air-conditioning apparatus furthermore has an air path 80 by way of which air reaches the cabin 40.

The refrigeration circuit 6 in the variants of FIGS. 2 and 3 has a compressor 82, a plurality of evaporators, specifically the air-conditioning evaporator 74 and the chiller 20, as well as the condenser 42. The expansion valve 78 ahead of the chiller 20 is presently regulated as a function of the suction pressure of the refrigerant upstream of the compressor 82. The suction pressure is measured by means of a pressure sensor 84. The monitoring of the compressor 82 in FIGS. 2 and 3 takes place as a function of the high pressure and the hot gas temperature downstream of the compressor 82, said high pressure and said hot gas temperature being measured by means of a pressure and temperature sensor 86. Regulating the compressor 82 takes place as a function of a cooling demand for the cabin 40 or for the high-voltage accumulator 16, wherein a corresponding temperature at the air side on the air-conditioning evaporator 74, or of the coolant, respectively, is used as a control variable. The refrigeration circuit 6 in FIG. 2 additionally has two internal heat exchangers 88, in each case one for the air-conditioning evaporator 74 and the chiller 20. Only one internal heat exchanger 88 for both evaporators is disposed in the variant of FIG. 3. A check valve 90 is disposed downstream of the air-conditioning evaporator 74, said check valve 90 in the variant of FIG. 2 also being able to be disposed upstream of the internal heat exchanger 88. No internal heat exchanger 88 is present in a variant not shown. Further variants which are likewise not shown are derived by the use of a plurality of chillers 20, a plurality of condensers 42, or a plurality of separate refrigeration circuits 6.

Four switched states of the thermal system 2 will be explained hereunder by means of FIGS. 4 to 7. One of four switched states is in each case shown in said figures. The flow paths which result in each case for the coolant are in each case highlighted by bolder lines. Some reference signs have been omitted for reasons of clarity in FIGS. 4 to 7, but said reference signs can be derived directly from a comparison with FIG. 1.

The thermal system 2 for setting a respective switched state has a first actuator 51, a second actuator S2, and a third actuator S3, said actuators in the embodiment shown in each case being configured as a 3/2-way valve. Furthermore, a fourth actuator S4 is disposed for additionally connecting and separating on demand the heating circuit 14 to and from the cooling circuit 8 independently of the current switched state, said fourth actuator S4 here being configured as a shut-off valve and being disposed in the heating circuit supply flow 56. By contrast, the fourth actuator S4 in a variant not shown is disposed in the heating circuit return flow 54.

A first switched state is shown in FIG. 1. The HVA circuit 10 downstream and upstream of the heat source 24 is connected to the cooling circuit 8 such that the extended HVA circuit 12 in which the high-voltage accumulator 16 and the heat source 24 are connected in series is able to be utilized. To this end, the first actuator S1 is set to a first switched position, the second actuator S2 is set to a second switched position, and the third actuator S3 is set to a first switched position. The HVA pump 22 is activated. On account thereof, the high-voltage accumulator 16 can be heated by means of the heat source 24, and the latter can simultaneously also be cooled.

The first switched state overall is presently characterized by a connection in series of the high-voltage accumulator 16, the heat source 24, and also the chiller 20. Excess heat in the extended heating circuit 12 is transmitted, for example by means of the chiller 20, to the condenser 42 in the heating circuit 14 and therein is utilized for heating the cabin or is dissipated to the first ambient cooler 26 and to the environment, depending on whether the fourth actuator S4 is opened or closed. The heating circuit pump 44 is activated to this end. In one variant, the cooling circuit pump 36 is activated and the first ambient cooler 26 is utilized directly for discharging heat.

Figure 5:
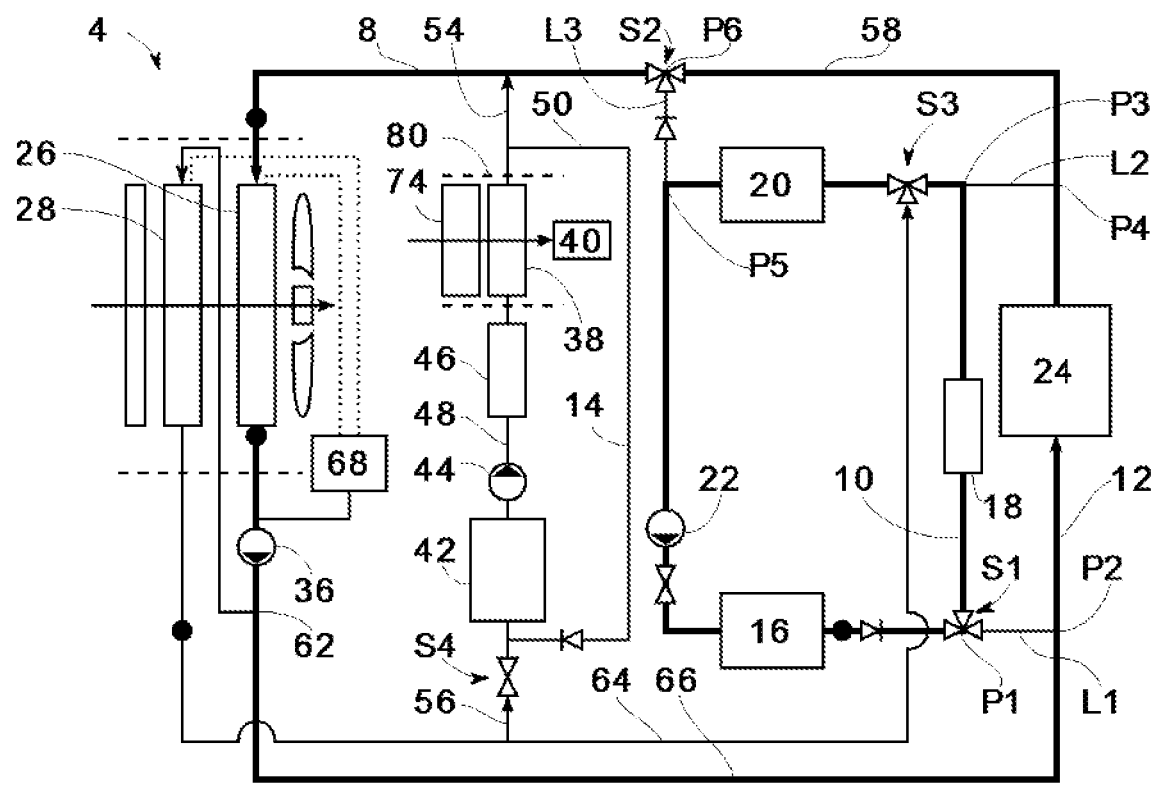
FIG. 5 shows a second switched state.

A second switched state is shown in FIG. 5. The HVA circuit 10 and the cooling circuit 8, by contrast to the first switched state, are herein mutually separated such that the chiller 20 is separated from the cooling circuit 8 and such that the first ambient cooler 26 is separated from the HVA circuit 10. To this end, the first actuator S1 is set to a second switched position, the second actuator S2 is set to a first switched position, and the third actuator S3 is set to the first switched position thereof. On account thereof, the heat source 24 and the high-voltage accumulator 16 are able to be temperature-controlled in a mutually independent manner. The second switched state, by virtue of the separation of the HVA circuit 10 and the cooling circuit 8, offers the possibility of choosing and setting various operating modes for the high-voltage accumulator 16 and the heat source 24 in a mutually independent manner. Potential operating modes are, for example, a first HVA cooling operation, a homogenization operation, a second HVA heating operation, a first heat source cooling operation. The HVA pump 22 or the cooling circuit pump 44, or both, are activated, depending on the operating mode.

In the first HVA cooling operation, the chiller 20 is activated and coolant in the HVA circuit 10 is conveyed by means of the HVA pump 22 such that the high-voltage accumulator 16 is cooled by means of the chiller 20. By contrast, in the homogenization operation the chiller 20 is deactivated, but coolant continues to be conveyed by means of the HVA pump 22 such that a temperature spread within the high-voltage accumulator 16 is reduced. In the second HVA heating operation, the HVA booster heater 18 in the HVA circuit 10 is activated, and coolant is conveyed by means of the HVA pump 22 such that the high-voltage accumulator 16 is heated. Discharging of heat into the heating circuit 14 herein is additionally possible in that the chiller 20 is activated. Independently of the afore-mentioned temperature-controlling of the high-voltage accumulator 16, exhaust heat from the heat source 24 in the first heat source cooling operation is discharged by way of the cooling circuit 8 and is dissipated to the environment by way of the first ambient heat exchanger 26, for example.

Figure 6:
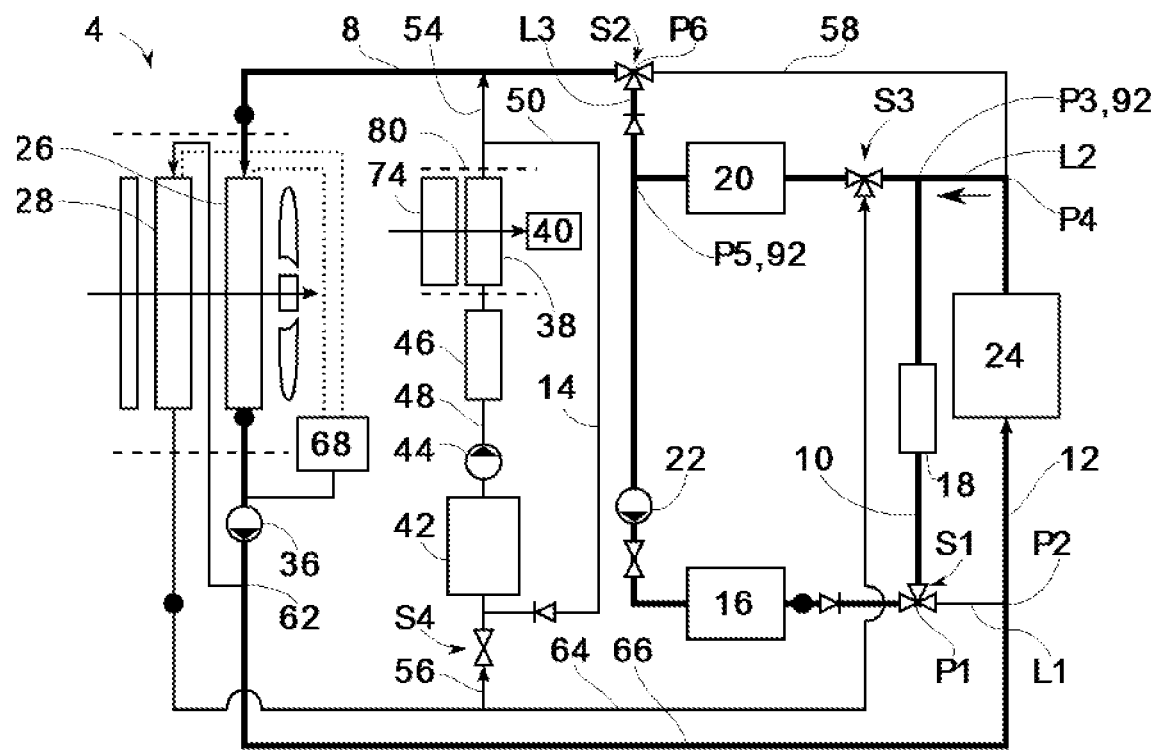
FIG. 6 shows a third switched state.

A third switched state is shown in FIG. 6. The HVA circuit 10 upstream and downstream of the chiller 20 is connected to the cooling circuit 8 such that the heat source 24, the chiller 20, and the first ambient cooler 26 are connected in series in such a manner that the heat source 24 is disposed upstream of the chiller 20 and the first ambient cooler 26 for cooling the heat source 24 by way of the chiller 20 or the first ambient cooler 26, or both, is disposed downstream of the chiller 20. To this end, the first actuator S1 is set to the second switched position thereof, the second actuator S2 is set to the second switched position thereof, and the third actuator S3 is set to the first switched position thereof. Furthermore, by contrast to the first and the second switched state, the third connecting line L3 but not the chiller bypass 58 is utilized in the third switched state.

Indirect cooling of the high-voltage accumulator 16 by means of the first ambient cooler 26 can be implemented in a simple manner by activating the HVA pump 22, despite said two components in the third switched state not being connected in series. To this end, one junction 92 is in each case configured upstream and downstream of the chiller such that two sub-branches, specifically an HVA branch and a cooler branch, are configured. The HVA branch commences at the junction 92 downstream of the chiller 20, runs by way of the high-voltage accumulator 16, the HVA booster heater 18, and finally to the junction 92 upstream of the chiller 20. The cooler branch likewise commences at the junction 92 downstream of the chiller 20, but then runs by way of the third connecting line L3 and the second actuator S2 to the first ambient cooler 26, and from there by way of the heat source 24 to the junction 92 upstream of the chiller 20. The junctions 92 in the embodiment shown are identical to the third and the fifth connector point P3, P5, respectively. The coolant from the HVA branch and from the cooler branch parallel with the former mixes at the junction 92 upstream of the chiller 20, such that the high-voltage accumulator 16 is correspondingly cooled by means of the first ambient cooler 26.

The third switched state thus enables the following two operating modes. A second heat source cooling operation, in which the heat source 24 is cooled by means of the chiller 20 and optionally, additionally by means of the first ambient cooler 26. A second HVA cooling operation, in which the HVA pump 22 is activated in addition to the cooling circuit pump 36, such that the high-voltage accumulator 16 is cooled indirectly by way of the cooling circuit 8.

Figure 7:
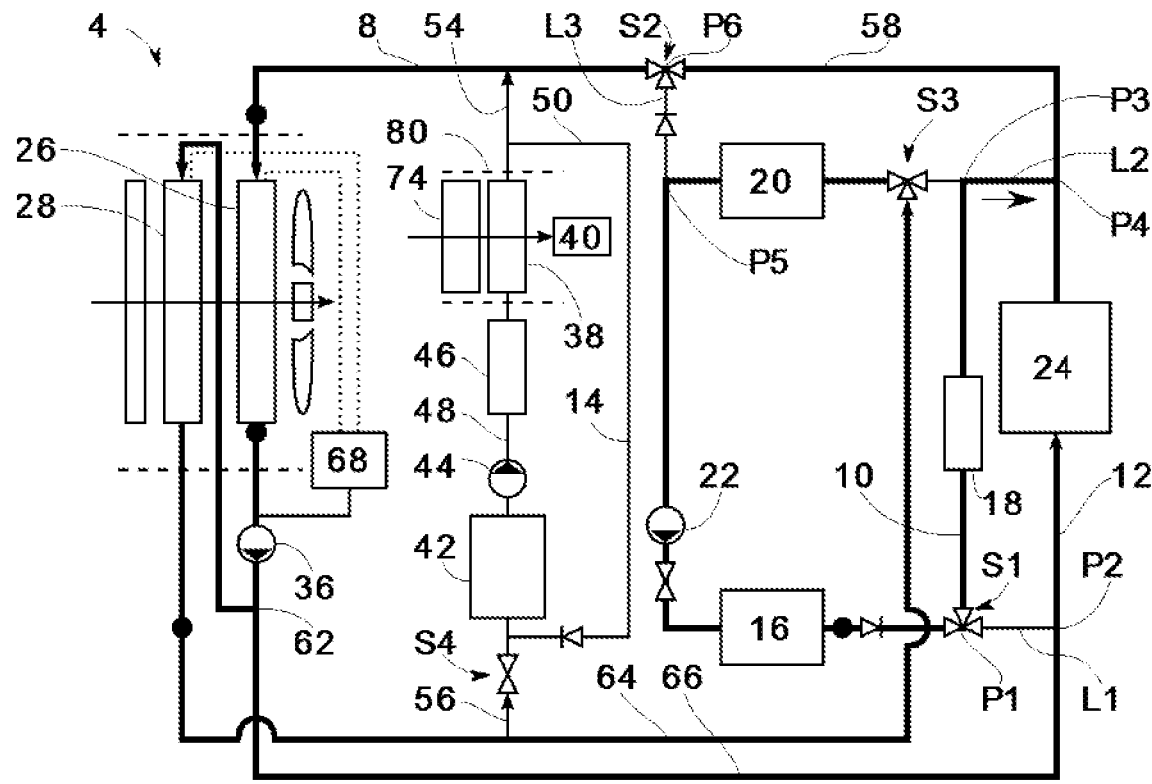
FIG. 7 shows a fourth switched state.

A fourth switched state is shown in FIG. 7. In said fourth switched state, the HVA circuit 10 upstream and downstream of the heat source 24 is connected to the cooling circuit 8 in such a manner that the heat source 24 is connected in parallel with the high-voltage accumulator 16 and the chiller 20. The chiller 20 in this instance is disposed downstream of the first ambient cooler 26 and upstream of the high-voltage accumulator 16. To this end, the first actuator S1 is set to the second switched position thereof, the second actuator S2 is set to the first switched position thereof, and the third actuator S3 is set to a second switched position. On account thereof, a third HVA cooling operation in which the high-voltage accumulator 16 is cooled by means of the chiller 20 as well as by way of the cooling circuit 8 and presently by way of both ambient coolers 26, 28 is able to be set. The first heat source cooling operation is also able to be simultaneously set.

By contrast to the other three switched states, the second ambient cooler 28 is now also utilized for cooling the high-voltage accumulator 16 in the fourth switched state, that is to say that coolant emanating from the cooler junction 62 is fed to the HVA circuit 10. Two sub-branches, specifically a first sub-branch and a second sub-branch among which the coolant is correspondingly divided are configured so as to proceed from the cooler junction 62. The first sub-branch commences at the cooler junction 62, runs to the heat source 24 and thereafter terminates at the fourth connector point P4. The second sub-branch commences likewise at the cooler junction 62, but then runs by way of the second ambient cooler 28 to the third actuator S3, and from there into the HVA circuit 10 in which first the chiller 20 and thereafter the high-voltage accumulator 16 are passed through. The second sub-branch by way of the first actuator S1 then runs onward to the HVA booster heater 18, thereafter to the third connector point P3, from there by way of the second connecting line L2 and terminates likewise at the fourth connector point P4. By contrast to the first and the third switched state, the flow direction of the coolant on the second connecting line L2 is reversed in the fourth switched state.

Figure 8:
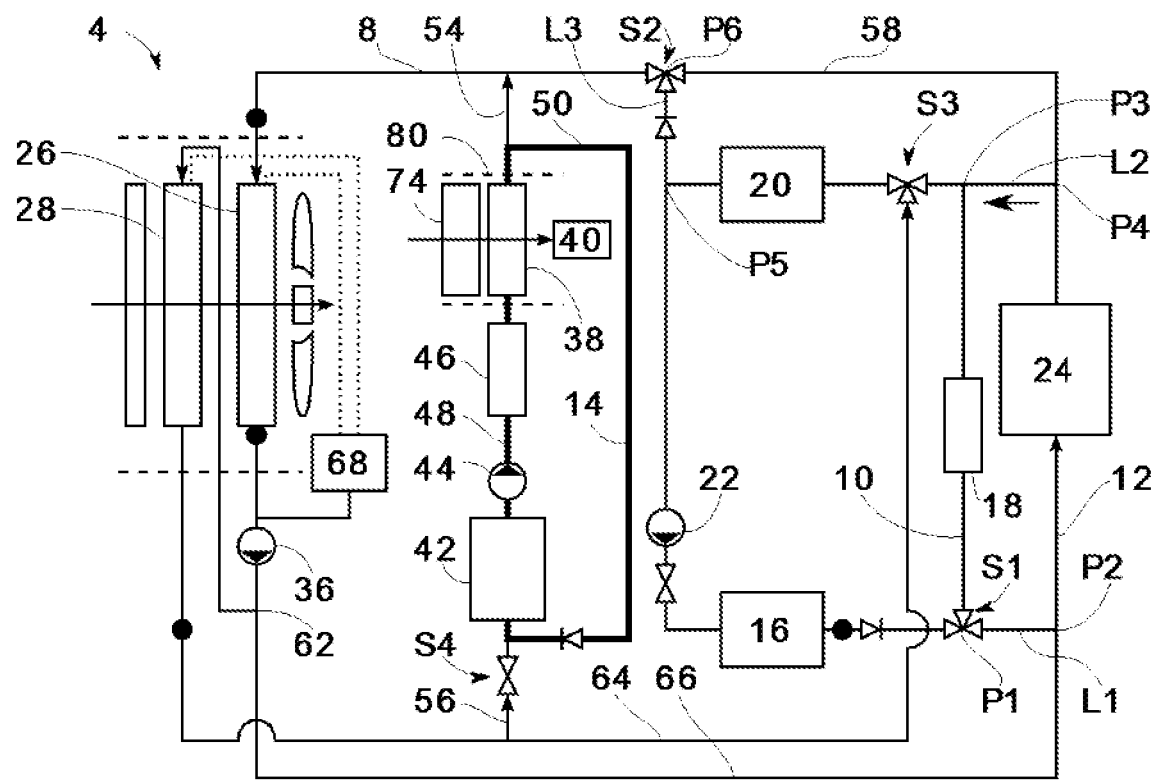
FIG. 8 shows a comprehensive cooling circuit having a shut-off heating circuit.
Figure 9:
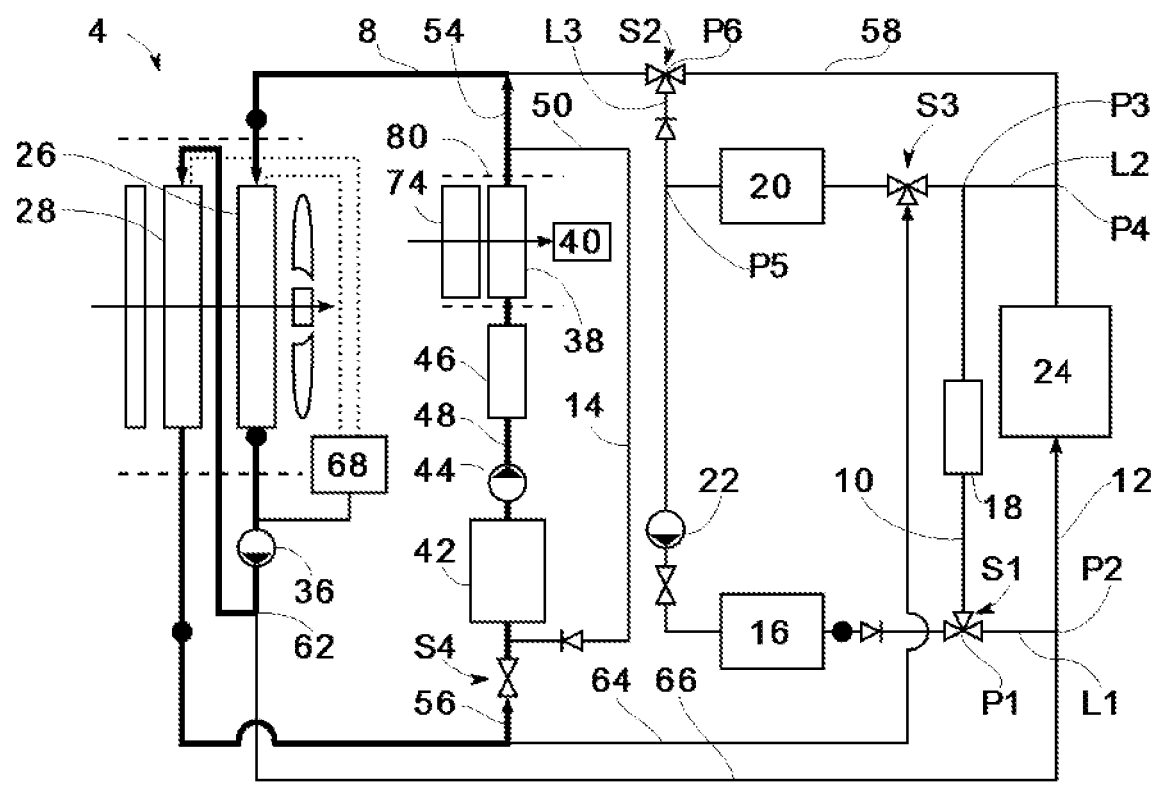
FIG. 9 shows the comprehensive cooling circuit having an opened heating circuit.

The operation of the heating circuit 14 is highlighted in FIGS. 8 and 9. FIG. 8 herein shows two switched positions of the fourth actuator S4. A first switched position of the fourth actuator S4 on account of which the heating circuit 14 is separated from the cooling circuit 8 is shown in FIG. 8. On account thereof, heating the cabin is possible as a further operating mode. Herein, either heat which reaches the heating circuit 14 by way of the heat pump is utilized, or the heating circuit booster heater 46 is activated so as to generate heat, or both. Depending on the switched state, the exhaust heat of the high-voltage accumulator 16 or of the heat source 24, or of both, is in this instance used for heating the cabin. In one variant, heat is especially generated by means of the HVA booster heater 18 and by means of a heat pump transmitted into the heating circuit 14 and therein used for heating the cabin.

By contrast, FIG. 9 shows a second switched position of the fourth actuator S4, on account of which the heating circuit 14 is connected to the cooling circuit 8, in the embodiment shown especially by linking to the second sub-branch described above, the latter commencing at the cooler junction 62 and also containing the second ambient cooler 28. In this switched position it is possible for dissipating to the environment heat which reaches the heating circuit 14 from the heat pump. A mixed operation is also possible.

The air-conditioning evaporator 74 is activated for cooling the cabin. A dehumidification of the cabin in this instance results by combining the cabin cooling and the cabin heating.

LIST OF REFERENCE SIGNS

2 Thermal system
4 Comprehensive cooling circuit
6 Refrigeration circuit
8 Cooling circuit
10 HVA circuit
12 Extended HVA circuit
14 Heating circuit
16 High-voltage accumulator
18 HVA booster heater
20 Chiller
22 HVA pump
23 HVA check valve
24 Heat source
25 HVA shut-off valve
26 First ambient cooler
28 Second ambient cooler
30 Ambient air path
32 Fan
34 Air flaps
36 Cooling circuit pump
38 Heating heat exchanger
40 Cabin
42 Condenser
44 Heating circuit pump
46 Heating circuit booster heater
48 Main train
50 Return train
52 Check valve
54 Heating circuit supply flow
56 Heating circuit return flow
58 Chiller bypass
60 Check valve
62 Cooler junction
64 LT branch
65 HT branch
68 Equalization volume
70 Control unit
72 Temperature sensor
74 Air-conditioning evaporator
76 Expansion valve
78 Expansion valve
80 Air path
82 Compressor
84 Pressure sensor
86 Pressure and temperature sensor
88 Internal heat exchanger
90 Check valve
92 Junction
L1 First connecting line
L2 Second connecting line
L3 Third connecting line
P1 First connector point
P2 Second connector point
P3 Third connector point
P4 Fourth connector point
P5 Fifth connector point
P6 Sixth connector point
S1 First actuator
S2 Second actuator
S3 Third actuator
S4 Fourth actuator The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A thermal system having a plurality of switched states for a vehicle comprising:
    a heat source for heating a high-voltage accumulator;
    a cooling circuit connected to the heat source;
    a refrigeration circuit;
    a high-voltage accumulator (HVA) circuit connected to the high-voltage accumulator for supplying power to an electric drivetrain of the vehicle;
    an ambient cooler exchanging heat and connected to the cooling circuit downstream of the heat source;
    a chiller transferring heat from the HVA circuit into the refrigeration circuit; and
    an extended HVA circuit connecting the high-voltage accumulator and the heat source in series, wherein
        a first switched state of the thermal system connects the HVA circuit downstream and upstream of the heat source and connects to the extended HVA circuit for heating the high-voltage accumulator using the heat source,
        a second switched state configures the thermal system such that:
            the HVA circuit cools the heat source using the chiller, the ambient cooler, or both, and is connected upstream and downstream of the chiller; and
            the heat source, the chiller, and the ambient cooler are connected in series, such that:
                the heat source is disposed upstream of the chiller; and
                the ambient cooler is disposed downstream of the chiller.

2. The thermal system according to claim 1, comprising:
    a first actuator disposed downstream of the high-voltage accumulator and setting the first switched state, comprising:

a first switched position in which the HVA circuit is connected to the cooling circuit upstream of the heat source; and a second switched position in which the HVA circuit is separated from the cooling circuit or is connected downstream of the heat source.

3. The thermal system according to claim 1, wherein:
the heat source is a component of the electric drivetrain of the vehicle; and
the heat source is configured for generating additional heat by trimming in the first switched state.

4. The thermal system according to claim 1, further comprising:
a third switched state configuring the thermal system such that:
the chiller is separated from the cooling circuit; and
the ambient cooler is separated from the HVA circuit.

5. The thermal system according to claim 1, further comprising:
a junction is disposed upstream and downstream of the chiller to configure an HVA branch and a cooler branch, wherein
the high-voltage accumulator is connected to the HVA branch;
the heat source and the ambient cooler are connected to the cooler branch; and
a third switched state of the thermal system connects the HVA branch and the cooler branch in parallel to cool the high-voltage accumulator via the ambient cooler by mixing coolant from the HVA branch and the cooler branch.

6. The thermal system according to claim 2, further comprising:
a second actuator disposed upstream of the ambient cooler, comprising:
a first switched position in which the heat source is connected in series with the ambient cooler and bypasses the chiller; and
a second switched position in which the heat source, the chiller, and the ambient cooler are connected in series, wherein
a third switched state connects the chiller upstream of the ambient cooler and downstream of the heat source.

7. The thermal system according to claim 1, further comprising:
a third switched state configuring the thermal system such that:
the heat source is connected in parallel with the high-voltage accumulator and the chiller; and
the chiller is disposed downstream of the ambient cooler and upstream of the high-voltage accumulator.

8. The thermal system according to claim 7, further comprising:
an actuator disposed upstream of the chiller, comprising:
a first switched position in which the high-voltage accumulator is not connected in series with the ambient cooler; and
a second switched position in which the ambient cooler, the chiller, and the high-voltage accumulator are connected in series.

9. The thermal system according to claim 1, wherein the ambient cooler is a first ambient cooler, and the thermal system further comprises:

a cooler junction disposed downstream of the first ambient cooler from which an LT branch and an HT branch extend; and a second ambient cooler connected to the LT branch upstream of the HVA circuit, wherein:
the HT branch supplies coolant for the heat source; and
the LT branch is connected to the HVA circuit downstream of the chiller.

10. The thermal system according to claim 8, further comprising:
a heating circuit connected to a heating heat exchanger for heating cabin air for the vehicle; and
a condenser connected with the refrigeration circuit and the chiller forms a heat pump connected to the heating circuit, the heat pump transmitting heat from the chiller to the heating circuit, wherein
the condenser, the heating heat exchanger, and the ambient cooler are connected in series.

11. The thermal system according to claim 10, wherein the actuator is a first actuator and the thermal system further comprises:
a second actuator, comprising:
a first switched position in which the heating circuit for heating the cabin air is separated from the cooling circuit; and
a second switched position in which the heating circuit for dissipating heat from the heating circuit is connected to the cooling circuit.

12. The thermal system according to claim 10, further comprising:
a heating circuit booster heater to feed additional heat into the heating circuit, wherein
the heating circuit booster heater is disposed in the heating circuit downstream of the condenser and upstream of the heating heat exchanger.

13. The thermal system according to claim 1, further comprising:
an HVA booster heater to feed additional heat into the HVA circuit, wherein
the HVA booster heater is disposed in the HVA circuit downstream of the high-voltage accumulator and upstream of the chiller.

14. The thermal system according to claim 1, further comprising:
an HVA check valve disposed downstream of the high-voltage accumulator for blocking the high-voltage accumulator on both sides in the event of a defect; and
an HVA shut-off valve disposed upstream of the high-voltage accumulator and which is closed in a non-energized state.

15. An electric or hybrid vehicle having a thermal system according to claim 1.

16. A thermal system having a plurality of switched states for a vehicle comprising,
a heat source for heating a high-voltage accumulator;
a cooling circuit connected to the heat source,
a refrigeration circuit;
a high-voltage accumulator (HVA) circuit connected to the high-voltage accumulator for supplying power to an electric drivetrain of the vehicle;
an ambient cooler exchanging heat and connected to the cooling circuit downstream of the heat source;
a chiller transferring heat from the HVA circuit into the refrigeration circuit; and
an extended HVA circuit connecting the high-voltage accumulator and the heat source in series, wherein a switched state of the thermal system connects the HVA circuit downstream and upstream of the heat source and connects to the extended HVA circuit for heating the high-voltage accumulator using the heat source,
during a heating demand for the high-voltage accumulator:
the switched state is set;
a first HVA heating operation for which an HVA pump in the HVA circuit is activated; and
the high-voltage accumulator is heated by exhaust heat from the heat source.

17. The thermal system according to claim 16, wherein:
the heat source is a component of an electric drivetrain of the vehicle;
during a heating demand for the high-voltage accumulator:
the switched state is set; and
the heat source is trimmed to generate exhaust heat that heats the high-voltage accumulator.

18. The thermal system according to claim 16, wherein the switched state is a first switched state and the thermal system further comprises:
a second switched state set during a heat demand for the high-voltage accumulator or during a cooling demand for the heat source, or both, the second switched state configuring the thermal system such that:
the HVA circuit and the cooling circuit are mutually separated;
the chiller is separated from the cooling circuit; and
the ambient cooler is separated from the HVA circuit, wherein
the second switched state sets at least one operation mode selected from the group consisting of:
a first HVA cooling operation in which the chiller is activated and coolant is conveyed in the HVA circuit to cool the high-voltage accumulator by the heat source;
a homogenization operation deactivating the chiller and conveying coolant in the HVA circuit such that a temperature spread within the high-voltage accumulator is reduced;
a second HVA temperature-controlling operation activating an HVA booster heater in the HVA circuit and conveying coolant in the HVA circuit such that the high-voltage accumulator is heated; and
a first heat source cooling operation in which exhaust heat from the heat source is discharged to the cooling circuit.

19. The thermal system according to claim 16, wherein the switched state is a first switched state and the thermal system further comprises:
a second switched state set during a cooling demand for the high-voltage accumulator, the second switched state configuring the thermal system such that:
the heat source is connected in parallel with the high-voltage accumulator and the chiller;
the chiller is disposed upstream of the ambient cooler and downstream of the high-voltage accumulator; and
an HVA cooling operation cools the high-voltage accumulator via the chiller and the cooling circuit, or only via the cooling circuit.

20. A thermal system having a plurality of switched states for a vehicle comprising:
a heat source for heating a high-voltage accumulator;
a cooling circuit connected to the heat source;
a refrigeration circuit;
a high-voltage accumulator (HVA) circuit connected to the high-voltage accumulator for supplying power to an electric drivetrain of the vehicle;
an ambient cooler exchanging heat and connected to the cooling circuit downstream of the heat source;
a chiller transferring heat from the HVA circuit into the refrigeration circuit; and
an extended HVA circuit connecting the high-voltage accumulator and the heat source in series, wherein
a first switched state of the thermal system connects the HVA circuit downstream and upstream of the heat source and connects to the extended HVA circuit for heating the high-voltage accumulator using the heat source,
a second switched state of the thermal system is set during a cooling demand for the high-voltage accumulator or for the heat source, or both, the second switched state configuring the thermal system such that:
the heat source, the chiller, and the ambient cooler are connected in series;
the heat source is disposed upstream of the chiller; and
the ambient cooler is disposed downstream of the chiller, wherein
the second switched state sets at least one operation mode selected from the group consisting of:
a HVA cooling operation in which coolant is conveyed in the HVA circuit as well as in the cooling circuit and the coolant in the cooling circuit is cooled and mixed with the coolant in the HVA circuit such that the high-voltage accumulator is cooled indirectly by way of the cooling circuit; and
a heat source cooling operation in which the heat source is cooled by means of the chiller.

* * * * *